US011200564B2

(12) United States Patent
Fay et al.

(10) Patent No.: US 11,200,564 B2
(45) Date of Patent: Dec. 14, 2021

(54) SYSTEMS AND METHODS OF BLOCKCHAIN TRANSACTION RECORDATION

(71) Applicant: Nasdaq, Inc., New York, NY (US)

(72) Inventors: Thomas Fay, Succasunna, NJ (US); Dominick Paniscotti, Totowa, NJ (US)

(73) Assignee: NASDAQ, INC., New York, NY (US)

( * ) Notice: Subject to any disclaimer, the term of this patent is extended or adjusted under 35 U.S.C. 154(b) by 171 days.

(21) Appl. No.: 15/086,801

(22) Filed: Mar. 31, 2016

(65) Prior Publication Data

US 2016/0292672 A1   Oct. 6, 2016

Related U.S. Application Data

(60) Provisional application No. 62/140,802, filed on Mar. 31, 2015.

(51) Int. Cl.
  *G06Q 20/36*  (2012.01)
  *G06Q 20/06*  (2012.01)
  (Continued)

(52) U.S. Cl.
  CPC .......... *G06Q 20/363* (2013.01); *G06Q 20/06* (2013.01); *G06Q 20/36* (2013.01);
  (Continued)

(58) Field of Classification Search
  CPC ....... H04L 9/0618; G06Q 20/36; G06Q 20/40
  See application file for complete search history.

(56) References Cited

U.S. PATENT DOCUMENTS

| 7,356,696 B1 | 4/2008 | Jakobsson et al. |
| 7,359,877 B2 | 4/2008 | Malitzis et al. |

(Continued)

FOREIGN PATENT DOCUMENTS

| EP | 3767878 | * 1/2021 | ............... H04L 9/32 |
| WO | WO 00/26745 | 5/2000 | |

(Continued)

OTHER PUBLICATIONS

Biryukov, Deanonymisation of Clients in Bitcoin P2P Network, CCS '14: Proceedings of the 2014 ACM SIGSAC Conference on Computer and Communications SecurityNov. 2014 pp. 15-29 (Year: 2014).*

(Continued)

*Primary Examiner* — Isidora I Immanuel
(74) *Attorney, Agent, or Firm* — Nixon & Vanderhye P.C.

(57) ABSTRACT

A computer system is provided that communicates with a distributed blockchain computing system that includes multiple computing nodes. The exchange stores an order book and a plurality of digital wallets associated with different clients. The computer system receives new data transaction requests that are added to the order book. A match is identified between data transaction requests and hashes associated with the digital wallets associated with the respective data transaction requests are generated. The counterparties receive the hashes of the other party along with information on the match and each party causes blockchain transactions to be added to the blockchain of the blockchain computing system. The computing system then monitors the blockchain to determine if both sides of the match has been added to the blockchain.

10 Claims, 16 Drawing Sheets

(51) Int. Cl.
  *G06Q 20/38* (2012.01)
  *G06Q 20/40* (2012.01)
  *H04L 12/26* (2006.01)

(52) U.S. Cl.
  CPC ..... *G06Q 20/3827* (2013.01); *G06Q 20/3829* (2013.01); *G06Q 20/4014* (2013.01); *H04L 43/08* (2013.01); *G06Q 2220/00* (2013.01)

(56) References Cited

U.S. PATENT DOCUMENTS

| | | | |
|---|---|---|---|
| 7,487,123 | B1 | 2/2009 | Keiser et al. |
| 7,778,915 | B2 | 8/2010 | Angle et al. |
| 7,895,112 | B2 | 2/2011 | Richmann et al. |
| 7,921,051 | B2 | 4/2011 | Serkin et al. |
| 7,933,827 | B2 | 4/2011 | Richmann et al. |
| 7,974,907 | B2 | 7/2011 | Miller et al. |
| 8,132,005 | B2 | 3/2012 | Tarkkla et al. |
| 8,190,893 | B2 | 5/2012 | Benson et al. |
| 8,244,622 | B2 | 8/2012 | Hughes, Jr. et al. |
| 8,386,362 | B2 | 2/2013 | Failla et al. |
| 8,412,952 | B1 | 4/2013 | Ramzan et al. |
| 8,606,685 | B2 | 12/2013 | Keiser et al. |
| 9,298,806 | B1 | 3/2016 | Vessenes et al. |
| 2003/0009413 | A1 | 1/2003 | Furbush et al. |
| 2003/0225672 | A1 | 12/2003 | Hughes et al. |
| 2008/0140578 | A1 | 6/2008 | Felt et al. |
| 2010/0250447 | A1 | 9/2010 | Hughes |
| 2011/0231913 | A1 | 9/2011 | Feng et al. |
| 2013/0238478 | A1 | 9/2013 | Bruno |
| 2013/0238903 | A1* | 9/2013 | Mizunuma ............. H04L 63/08 713/176 |
| 2013/0254052 | A1 | 9/2013 | Royyuru et al. |
| 2014/0280476 | A1 | 9/2014 | Chiussi et al. |
| 2014/0344015 | A1 | 11/2014 | Puertolas-Montanes et al. |
| 2015/0120567 | A1* | 4/2015 | Van Rooyen ........... G06F 21/10 705/59 |
| 2015/0170112 | A1 | 6/2015 | Decastro |
| 2015/0227897 | A1 | 8/2015 | Loera |
| 2015/0244690 | A1 | 8/2015 | Mossbarger |
| 2015/0262137 | A1* | 9/2015 | Armstrong ............. G06Q 20/65 |
| 2015/0262173 | A1 | 9/2015 | Durbin et al. |
| 2015/0269557 | A1* | 9/2015 | Artman ............. G06Q 20/3278 705/41 |
| 2015/0310424 | A1 | 10/2015 | Myers |
| 2015/0324787 | A1 | 11/2015 | Schaffner |
| 2015/0332283 | A1 | 11/2015 | Witchey |
| 2015/0356523 | A1 | 12/2015 | Madden |
| 2015/0356555 | A1 | 12/2015 | Pennanen |
| 2015/0363777 | A1 | 12/2015 | Ronca et al. |
| 2015/0363783 | A1 | 12/2015 | Ronca et al. |
| 2015/0379510 | A1 | 12/2015 | Smith |
| 2016/0027229 | A1 | 1/2016 | Spanos et al. |
| 2016/0028552 | A1 | 1/2016 | Spanos et al. |
| 2016/0078219 | A1 | 3/2016 | Hernan |
| 2016/0080156 | A1 | 3/2016 | Kaliski, Jr. et al. |
| 2016/0112200 | A1 | 4/2016 | Kheterpal et al. |
| 2016/0125040 | A1 | 5/2016 | Kheterpal et al. |
| 2016/0261404 | A1* | 9/2016 | Ford ..................... H04L 67/104 |
| 2016/0342994 | A1 | 11/2016 | Davis |

FOREIGN PATENT DOCUMENTS

| | | |
|---|---|---|
| WO | WO 01/67409 | 9/2001 |
| WO | WO 01/86373 | 11/2001 |
| WO | WO 2008/127428 | 10/2008 |
| WO | WO 2015/059669 | 4/2015 |
| WO | WO 2015/085393 | 6/2015 |
| WO | WO 2015/113519 | 8/2015 |
| WO | WO 2015/179020 | 11/2015 |
| WO | WO 2016/008659 | 1/2016 |
| WO | WO 2016/022864 | 2/2016 |
| WO | WO 2016/029119 | 2/2016 |

OTHER PUBLICATIONS

International Search Report and Written Opinion issued in Application No. PCT/US16/25189 dated Jul. 1, 2016 (15 pp.).
Satoshi Nakamoto, "Bitcoin: A Peer-to-Peer Electronic Cash System," Nov. 2008, 9 pages.
Nakamoto, S., "Bitcoin: A Peer-to-Peer Electronic Cash System," www.bitcoin.org, 9 pages.
"Digital Currency Exchange Goes Live to Public in Melbourne, Australia," AlphaPoint, https://globenewswire.com/news-release/2015/12/10/794524/0/en/Digital-Currency-Exchange-Goes-Live-to-Public-in-Melbourne-Australia.html, Dec. 10, 2015, 3 pages.
"Nasdaq Linq Enables First-Ever Private Securities Issuance Documented with Blockchain Technology," Nasdaq, https://globenewswire.com/news-release/2015/12/30/798660/0/en/Nasdaq-Linq-Enables-First-Ever-Private-Securities-Issuance-Documented-With-Blockchain-Technology.html, Dec. 30, 2015, 3 pages.
"Nasdaq Linq Enables First-Ever Private Securities Issuance Documented with Blockchain Technology," Nasdaq, http://ir.nasdaq.com/releasedetail.cfm?ReleaseID=948326, Dec. 30, 2015, 5 pages.
"Nasdaq Announces Inaugural Clients for Initial Blockchain-Enabled Platform 'Nasdaq Linq'," Nasdaq, https://globenewswire.com/news-release/2015/10/27/780452/10154158/en/Nasdaq-Annouces-Inaugural-Clients-for-Initial-Blockchain-Enabled-Platform-Nasdaq-Linq.html, Oct. 27, 2015, 5 pages.
"Overstock.com Announces Historic Blockchain Public Offering," Overstock.com to .com, hpps://globenewswire.com/news-release/2016/03/16/820477/0/en/Overstock-com-Announces-Historic-Blockchain-Public-Offering.html, Mar. 16, 2016, 3 pages.
"Nasdaq's Blockchain Technology to Transform the Republic of Estonia's e-Residency Shareholder Participation," Nasdaq, https://globenewswire.com/news-release/2016/02/12/810223/0/en/Nasdaq-s-blockchain-technology-to-transform-the-Republic-of-Estonia-s-e-Residency-shareholder-participation.html, Feb. 12, 2016, 4 pages.
"Nasdaq and Chain to Partner on Blockchain Technology Initiative," Nasdaq, https://globenewswire.com/news-release/2015/06/24/747144/10139529/en/Nasdaq-and-Chain-to-Partner-on-Blockchain-Technology-Initiative.html, Jun. 24, 2015, 3 pages.
"Blockchain Technologies Corp Makes History, 2016 Iowa Caucus Results Forever Documented on Blockchain," https://globenewswire.com/news-release/2016/02/06/808320/10159855/en/Blockchain-Technologies-Corp-Makes-History-2016-Iowa-Caucus-Results-Forever-Documented-on-Blockchain.html, Feb. 5, 2016, 2 pages.
"AlphaPoint Announces Blockchain Solution Custom Built for Financial Institutions," AlphaPoint, https://globenewswire.com/news-release/2015/10/26/779929/0/en/AlphaPoint-Announces-Blockchain-Solution-Custom-Built-for-Financial-Institutions.html, Oct. 26, 2015, 3 pages.
"Nasdaq Launches Enterprise-Wide Blockchain Technology Initiative," Nasdaq, https://globenewswire.com/news-release/2015/05/11/734456/10133665/en/Nasdaq-Launches-Enterprise-Wide-Blockchain-Technology-Initiative.html, May 11, 2015, 3 pages.
"RR Donnelley to Pursue New Blockchain-Enabled Capabilities for Publishing Industry," https://globenewswire.com/news-release/2016/03/14/819355/0/en/RR-Donnelley-to-Pursue-New-Blockchain-Enabled-Capabilities-for-Publishing-Industry.html, Mar. 14, 2016, 3 pages.
Non-Final Office Action issued in U.S. Appl. No. 15/200,756, dated Jan. 2, 2018, 22 Pages.
Notice of Allowance issued in co-pending U.S. Appl. No. 15/086,801, dated Jun. 6, 2018, 8 pages.
European Search Report in Application No. 16774168.5 dated Jul. 23, 2018 (14 pages).

(56) References Cited

OTHER PUBLICATIONS

Protocol Specification https://web.archive.org/web/20150317044558/http://counterparty.io/docs/protocol_specification, Jul. 5, 2018 (9 pages).
Notification of Transmittal of International Preliminary Report on Patentability in Application No. PCT/US2016/040711 dated Jun. 26, 2017 (35 pages).
Antonopoulos, Andreas M., Mastering Bitcoin—Unlocking Digital Cryptocurrencies, O'Reilly Media, Inc. 2015 (297 pages).

* cited by examiner

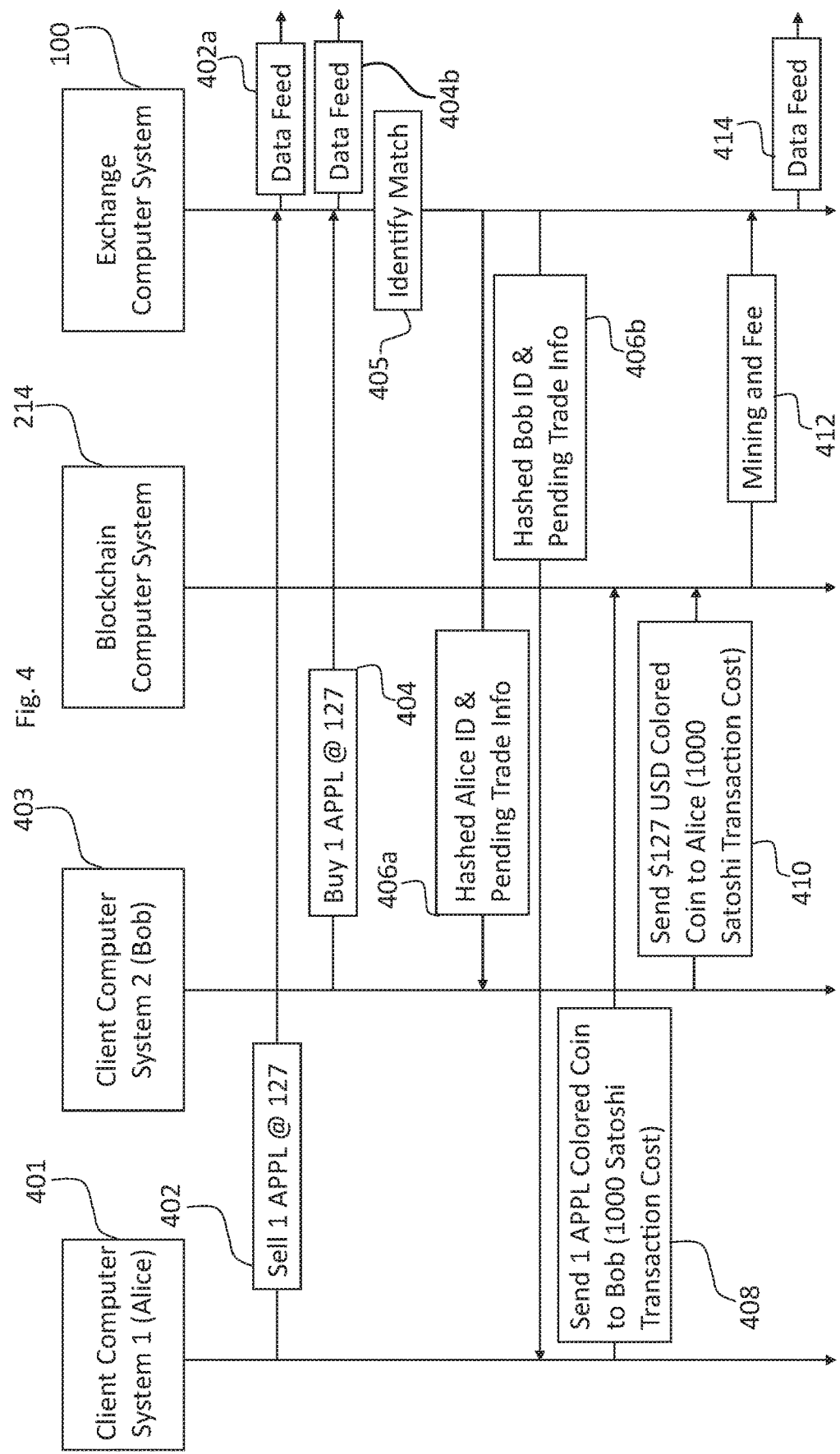

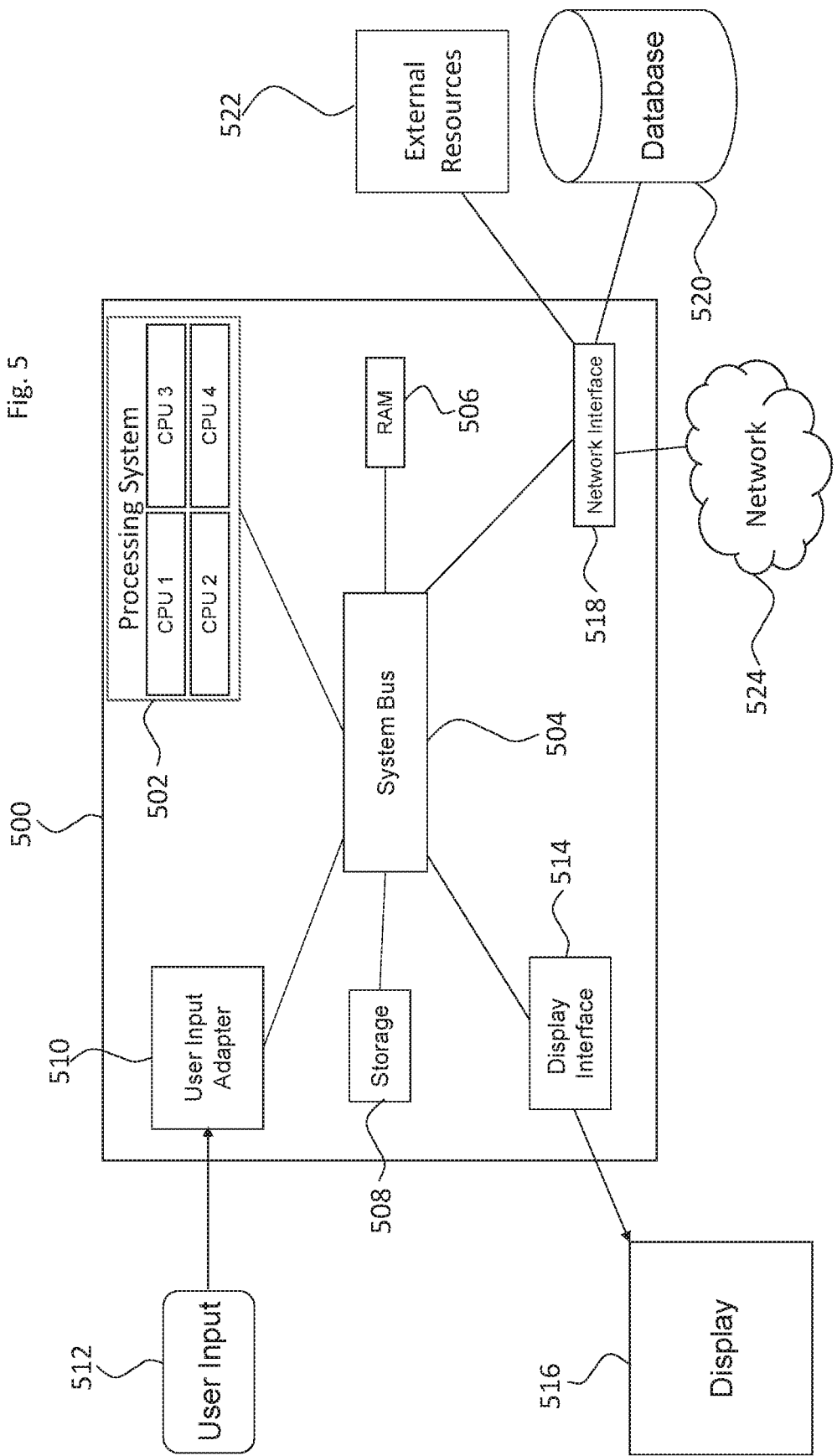

SYSTEMS AND METHODS OF BLOCKCHAIN TRANSACTION RECORDATION

CROSS REFERENCE(S) TO RELATED APPLICATION(S)

This application claims the benefit of U.S. Patent Application No. 62/140,802 filed Mar. 31, 2015, the entire contents of which are incorporated herein by reference.

TECHNICAL OVERVIEW

The technology herein relates to distributed transaction computer systems. More particularly, the technology herein relates to computer systems and processes that interface with a blockchain.

INTRODUCTION

Blockchain technology (sometimes simply referred to as blockchain) is a relatively new technology that has been used in digital currency implementations. It is described in a 2008 article by Satoshi Nakamoto, called "Bitcoin: A Peer-to-Peer Electronic Cash System," the entire contents of which are hereby incorporated by reference. The blockchain is a data structure that stores a list of transactions and can be thought of as a distributed electronic ledger that records transactions between source identifier(s) and destination identifier(s). The transactions are bundled into blocks and every block (except for the first block) refers back to or is linked to a prior block in the chain. Computer nodes maintain the blockchain and cryptographically validate each new block and thus the transactions contained in the corresponding block. This validation process includes solving a computationally difficult problem that is also easy to verify and is sometimes called a "proof-of-work."

The integrity (e.g., confidence that a previously recorded transaction has not been modified) of the entire blockchain is maintained because each block refers to or includes a cryptographic hash value of the prior block. Accordingly, once a block refers to a prior block, it becomes difficult to modify or tamper with the data (e.g., the transactions) contained therein. This is because even a small modification to the data will affect the hash value of the entire block. Each additional block increases the difficulty of tampering with the contents of an earlier block. Thus, even though the contents of a blockchain may be available for all to see, they become practically immutable.

The identifiers used for blockchain transactions are created through cryptography such as, for example, public key cryptography. For example, a user may create a destination identifier based on a private key. The relationship between the private key and the destination identifier can later be used to provide "proof" that the user is associated with the output from that created transaction. In other words, the user can now create another transaction to "spend" the contents of the prior transaction. Further, as the relationship between the destination identifier and the corresponding private key is only known by the user the user has some amount of anonymity as they can create many different destination identifiers (which are only linked through the private key). Accordingly, a user's total association with multiple transactions included in the blockchain may be hidden from other users. While the details of a transaction may be publically available on the distributed ledger, the underlying participants to those transactions may be hidden because the identifiers are linked to private keys known only to the corresponding participants.

While blockchain technology has the potential to offer new benefits, it also poses problems for certain types of implementations. For example, a decentralized and anonymous transaction ledger can be problematic for certain types of environments that desire or require transparency and/or auditability for the transactions. There is thus a need in the art to address these and other problems.

SUMMARY

In certain example embodiments, a computer system communicates with a blockchain computer system (e.g., one or more nodes that store a distributed ledger). The computer system includes data storage (e.g., a memory), a transceiver that communicates with remote computing devices, and a processing system that includes a hardware processor. The data storage stores one or more (usually two) ordered lists of data transaction requests per type identifier. The data transaction requests are received (via the transceiver) from remote computing devices. The data storage also stores digital wallets that are each associated with a different client account. Each digital wallet includes or is linked to a corresponding private key and an identifier that has been generated using the private key. Generally, the identifiers may be used as blockchain addresses for sending and/or receiving transactions.

When a new data transaction request is received at the computer system from a remote computing devices, the request is added to an ordered list that corresponds to the request's type identifier. The processing system is configured to execute a matching engine to identify matches between data transaction requests. In other words, the processing system identifies a match between a data transaction request stored in one of the ordered lists with another data transaction request (e.g., a newly received data transaction request). Once a match is identified, new identifiers are generated that are based on the data (e.g., the private key) of the digital wallets associated with the matched data transaction requests. The new identifiers are sent to the respective clients that then generate blockchain transactions using those identifiers. The computer system that identified the match then monitors the blockchain to determine when both blockchain transactions have been incorporated/included into the blockchain.

The features described herein may be combined to form additional embodiments and sub-elements of certain embodiments may form yet further embodiments. This summary is provided to introduce a selection of concepts that are further described below in the detailed description. This summary is intended neither to identify key features or essential features of the claimed subject matter, nor to be used to limit the scope of the claimed subject matter; rather, this summary is intended to provide an overview of the subject matter described in this document. Accordingly, it will be appreciated that the above-described features are merely examples, and that other features, aspects, and advantages of the subject matter described herein will become apparent from the following detailed description, figures, and claims.

BRIEF DESCRIPTION OF THE DRAWINGS

These and other features and advantages will be better and more completely understood by referring to the following detailed description of example non-limiting illustrative embodiments in conjunction with the drawings of which:

FIGS. 3A-3I is a series of illustrative diagrams that show processes that may be performed as part of a blockchain based exchange system;

FIG. 4 illustrates a process to performing transactions against a blockchain according to certain example embodiments; and FIG. 5 is an example computer system according to certain example embodiments.

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

In certain example embodiments, a computer system (i.e., an exchange computer system) stores two sorted lists of received electronic data messages that include data transaction requests (e.g. orders). When a match is identified between two (or more) orders, the exchange generates new blockchain identifiers to facilitate the blockchain transactions that will be generated. These identifiers are used by the respective clients associated with the matched orders to generate and submit blockchain transactions to a blockchain for verification thereon. Meanwhile the exchange monitors the blockchain to determine when both transactions have been verified by the blockchain (e.g., incorporated/included into one or more verified blocks of the blockchain).

Figure 1:
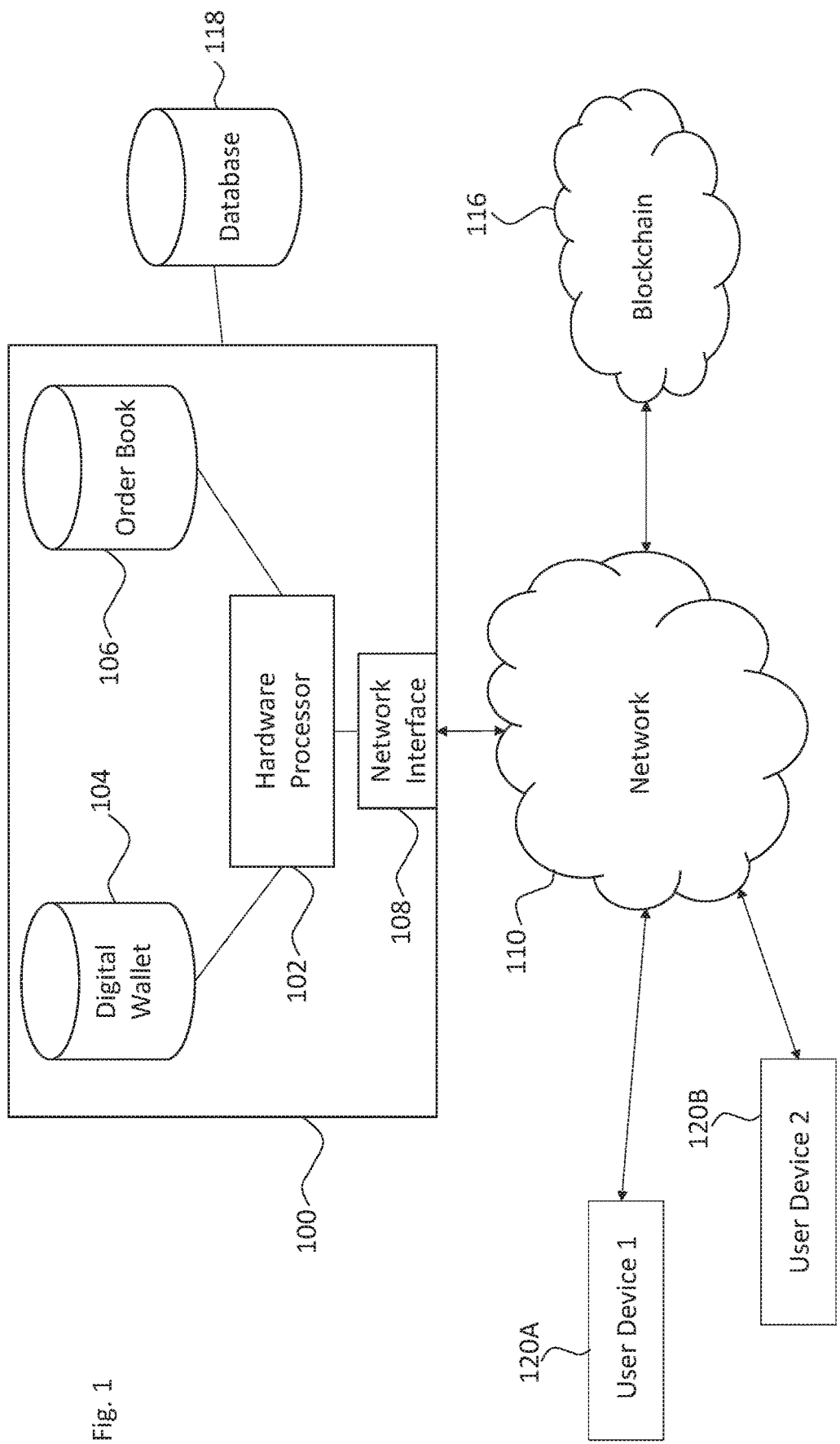
FIG. 1 illustrates a non-limiting example function block diagram of a computer-implemented exchange system that interfaces with a blockchain according to certain example embodiments.

FIG. 1 illustrates a non-limiting example function block diagram of an exchange computer system coupled via a network to a client system configured to create and place orders with the exchange. The exchange interacts with a blockchain. FIGS. 2A-2D an example process performed by an exchange computing system, client devices, trading parties, and a blockchain. FIGS. 3A-3I show another illustration of how client devices, exchange, and the blockchain perform the example processes described herein. FIG. 4 is another diagram that shows the example process discussed in connection with FIGS. 2A-3I. FIG. 5 shows an example hardware architecture used, in some embodiments, to implement the features shown in FIG. 1 through FIG. 4.

FIG. 1

By way of introduction, FIG. 1 shows a block diagram of an exchange computer system 100 that interfaces with a blockchain 116 and one or more user computing devices 120A and 120B via a network 110 (e.g., the Internet).

Exchange computer system 100 (which may also be termed an exchange computing system, computing system, or computer system) includes a hardware processor 102 (e.g., one or more CPUs) coupled to electronic data storage (e.g., volatile or non-volatile memory) that includes digital wallet 104 and order book 106. Digital wallet 104 and/or order book 106 may be data structures or other logical structures used to store associated data on common or dedicate electronic data storage (e.g., RAM, or a hard-drive). In certain example embodiments, dedicated hardware devices, such as a hardware security module (HSM), may be used to store information associated with digital wallet 104 or order book 106. In certain example embodiments, wallet memory may be stored on a dedicated storage hardware externally provided and in communication with exchange computer system 100.

Digital wallet 104 stores blockchain wallet information for users of user device 1 and user device 2 (and other clients or users that user the functionality provided by exchange computer system 100). A digital wallet is software and hardware, or specifically designed hardware, that stores information that allows an individual to make electronic commerce transactions that use, for example, a blockchain. The digital wallet can include or store a data structure that holds a private key (e.g., that is known to the holder of the wallet) and a series of identifiers (sometimes call wallet identifiers or walletIDs herein) that have been generated based on the private key. These identifiers are used to allow other users to "send" transactions, which are recorded on the blockchain, to that identifier. Software (e.g., a digital wallet application) associated with the stored information in the wallet may then be used to query the blockchain to determine what unspent transactions (e.g., those transaction outputs not used as input for another transaction) are associated with the identifiers that are in the wallet. Such software may then present a holistic view (e.g., via a graphical user interface) of what is "owned" by the holder of the wallet. For example, one hundred different blockchain transactions, which are each associated with 1 share of a company, may each be associated with different identifiers that have been generated using the same private key. While each transaction may appear (from the perspective of an outside third party) to be associated with a different identifier, the holder of the private key (and corresponding digital wallet) may be able to use the digital wallet to identify each the one-hundred separate transactions and belong in their wallet. The digital wallet may be programmed to provide a holistic view of all transactions that are associated with identifiers generated from the one or more private keys of a given digital wallet. Accordingly, in this example, a user may be presented with a view that they hold 100 shares of the company (as opposed to 100 separate transactions of 1 share). Thus, the identifiers that are used and/or included in the digital wallet 104 may provide blockchain transparency from the perspective of the user of the digital wallet.

In certain example embodiments, a digital wallet and its contents (e.g., private key and generated identifiers) are stored on a user controlled device 120A or 120B. In such an example, user devices 120A may transmit the identifiers and/or private key to the exchange computer system 100 for use thereby. Various elements of the digital wallet may thus be provided on the device of a user (e.g., that is owned by the user), the exchange computer system 100, or another third party system (e.g., a cloud based system that stores digital wallets and the information therein).

Wallet identifiers (and/or the private key of the wallet) that are stored in digital wallet 104 allow exchange computer system 100 to interact with blockchain 116 on behalf of the "owner" of the wallet. In certain example embodiments, the entity running the exchange computer system 100 may also store a digital wallet that includes a private key and wallet identifiers that allow customers to send payments to the exchange (e.g., transaction fees).

In certain example embodiments, the transactions on the blockchain 116 may include so-called "colored-coins." Colored coins are added on top of a traditional blockchain transaction and are used to identify additional digital data, which may in turn be associated with a tradable asset (e.g., a digital representation thereof). The mapping between a colored coin and additional information regarding the tradable asset may be stored in database 118 of exchange computer system 100. Tradable assets can include securities or other types of tradable goods or financial products. In certain instances, tradable assets can also include digital (Bitcoin) and real currency (e.g., U.S. dollars).

Order book 106 stores electronic data messages that have been received from order submitting clients (such as clients controlling a remote computing device such as user device 1 or 2). In certain example embodiments, order book 106 stores a list of electronic data messages. In certain implementations, two separately ordered lists are stored and maintained per type identifier (e.g., per ticker symbol or other asset identifier). The two lists may correspond to the buy and sell or bid and ask "sides" of an order book for a ticker symbol. The messages may be sorted according to one or more of: price, size, order submitting entity, time, time in the order book, etc. In certain examples, an order book is divided into two sides (side x and side y, which may be buy and sell sides). As an example, in some embodiments, the order book 106 stores, for a given type identifier (e.g., "AAPL"), an ordered list of buy orders for that type identifier and an ordered list of sell orders for that type identifier, where the two ordered lists are ordered according to factors such as price, size, and/or time, etc. . . . . An electronic data message that includes a new data transaction request (also referred to as an order in this and other examples herein) is received by the exchange computer system 100 via network interface 108 from an order submitting client (e.g., user device 1 or user device 2). Upon reception of the message, the hardware processor 102 may attempt to match the order included in the newly received electronic data message to existing orders stored in the order book 106. Alternatively, or in addition (e.g., if no match is found), the received electronic data message and/or its order is stored to the order book 106 for matching against future incoming electronic data messages that include orders.

Once a potential match is identified by the exchange computer system 100, then the matched orders are "traded" and settled by using blockchain 116. Exchange computer system 100 monitors the blockchain 116 to confirm the trades have taken place and based on this monitoring further processing may be performed (e.g., satisfying regulatory requirements, auditing, logging, etc. . . . ).

Exchange computer system 100 may be coupled to (or include) database 118. Database 118 may hold account information, audit information, mappings between blockchain transactions, colored coin mappings (e.g., a list of asset or type identifiers and the asset or type that those identifiers correspond to), and other data. In certain example embodiments, each asset may have or correspond to a private key. The private key may control the new creation of "new" instances of the asset on the blockchain (just like the private key of a client controls the creation of new blockchain addresses based on that private key).

FIGS. 2A-2D

Figure 2A:
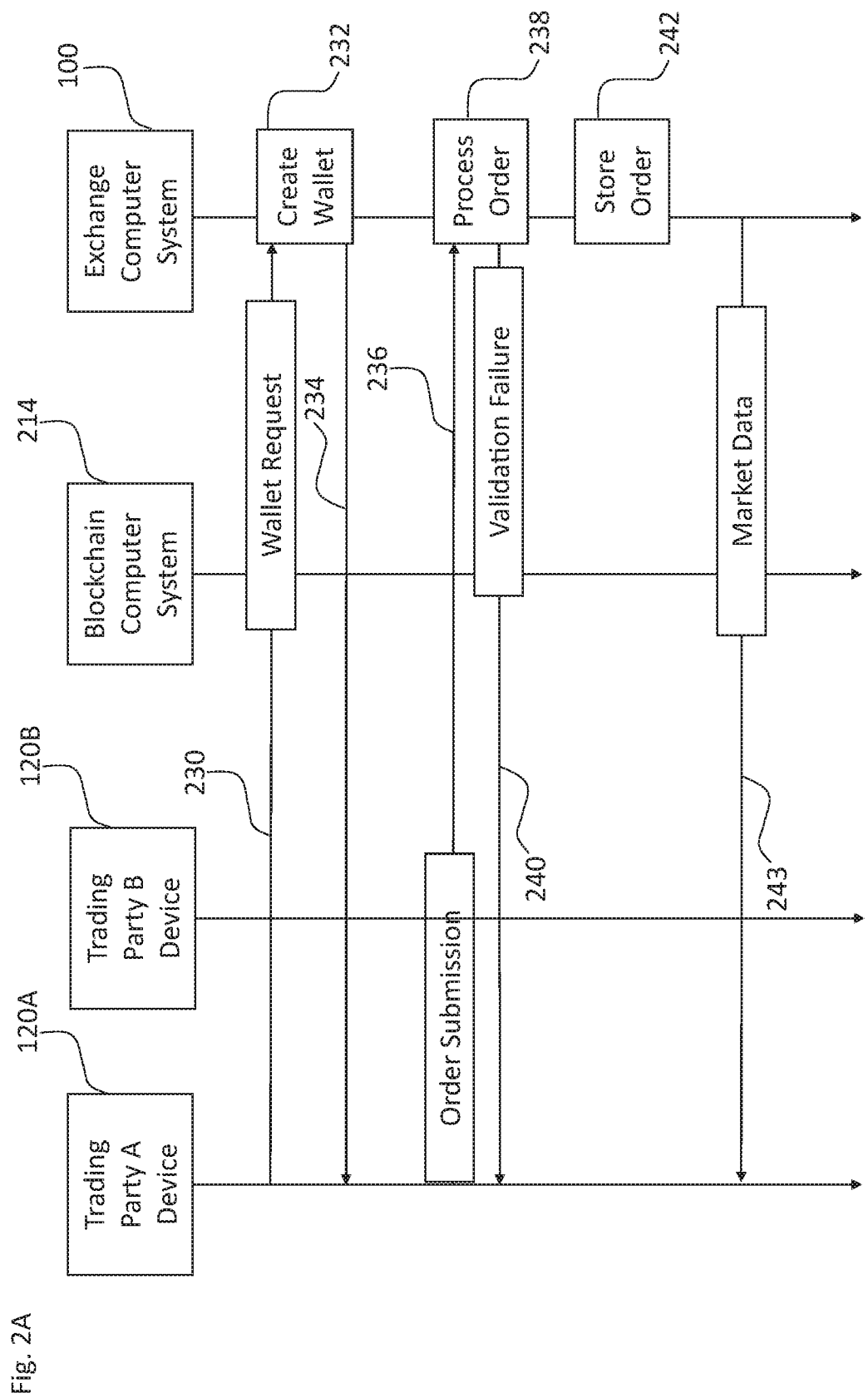
FIGS. 2A-2D is a series of flow charts of an example process that may be implemented using example blockchain based exchange techniques according to certain example embodiments

FIG. 2A shows a diagram of an example process that may be implemented according to certain example embodiments. FIG. 2A includes a user device for trading party A 120A (sometimes referred to as computing device A), a user device for trading party B (sometimes referred to as computing device B), a blockchain computer system 214 that stored a distributed ledger or blockchain (e.g., blockchain 116), and exchange computer system 100. Blockchain computer system 214 may be a public blockchain system that includes many different individual computer systems that are operated by different entities that maintain a single blockchain. Alternatively, blockchain computer system 214 may include one or more individual computer systems that are all operated by a single entity (e.g., a private or closed blockchain computer system). In certain examples, the entity that operates the exchange computer system 100 may also operate and maintain the blockchain computer system 214 (or a portion thereof) and the blockchain 116 that is maintained by those systems.

The blockchain computer system 214 includes multiple different computer nodes that each operate to "mine" and thereby validate transactions submitted to the blockchain 116. Generally, only one of the nodes needs to "receive" a transaction that has been submitted from a client. Once one node receives a transaction it may propagate the transaction to other nodes within the blockchain computer system 214.

Each transaction (or a block of transactions) is incorporated/included into the blockchain 116 via a proof-of-work mining process. The mining process may involve solving a computationally difficult problem that is also easy to verify. For example, each node may attempt to "mine" a solution to the hash of a block or a transaction. Hashes (also referred to herein as "hash functions," "cryptographic hash functions," and the like) include functions that map an initial input data set to an output data set. The output from a hash function may be referred to herein as a "hash identifier," "hash value," "hash data set," or simply, a "hash"). Generally, the output values from a given hash function have the same fixed length. Generally, if the same hash function is used on the same input data it will result in the same output data value. With some hash functions (including those used in the context of blockchain techniques and/or the subject matter of this application) the input value is computationally difficult to determine when only the output value is known. In certain examples, the input value for the hash function is supplemented with some additional random data. For example, an input value of "blockchain" for a hash function may include addition random data such as three random characters. Accordingly, the data value that is hashed may be "blockchaina5 h" instead of simply "blockchain." The additional random data is sometimes called a "nonce."

In order to validate a new block into the blockchain, the proof of work process (or hash operation process) that is performed may include finding an input hash value (i.e., the block) that results in an output hash value that meets a given condition. As the data related to the blockchain transactions in the block are fixed, miners (e.g., nodes on the blockchain) modify the nonce value that is included as part of the block being validated until the output value of the hash function meets the given condition. For example, a target output value may have 5 zeros as the first four numbers of the hash. This is a problem that may be computationally difficult to determine, yet relatively easy to verify. Each node that is part of the blockchain may also keep a copy or a portion of the blockchain 116 in storage (e.g., on disk or in RAM) that is local to the corresponding node.

Computing devices A and B (120A and 120B respectively) may include user systems (e.g., a user device such as smart phone, tablet, computer, or other computing device as described in connection with FIG. 5 or FIG. 1). In certain example embodiments, computing device A 120A and computing device B 120B may be a computer system that is controlled or operated by a traditional broker or other "middle-man." In certain example embodiments, computing devices A and B may be used by a human end user (e.g., the entity or person that ultimately will "own" the asset in question or a person that is affiliated with the entity that will ultimately own the asset in question). Alternatively, and/or in addition, computing devices A and/or B may be included as part of the exchange computer system 100 and be part of a computer system that is operated by users, clients, customers, etc. . . . of the exchange computer system 100. For example, computing devices A and/or B may be hosted in the cloud or with the computing resources of exchange computer system 100). In other words, the processing resources that are used to carry out functionality that is described in connection with computing device A 120A and computing device B 120B may be remotely located from a computing device to which a user provides input this may be a "hosted" computing option.

At step 230, the trading party A's computing device 120A sends a request (e.g., that is carried in an electronic data message) to the electronic exchange computing system 100 to create a new wallet for a corresponding trading party account. A trading party (as opposed to the device used by the trading party) can represent a user (e.g., a person), organization (e.g., a corporation), or other entity that is assigned an account (a trading party account) for electronically interacting with the electronic exchange computer system 100. In certain example embodiments, step 230 may be an internal API call within the exchange computer system 100 (e.g., that is triggered based on a request from a user device controlled by a user).

In response to reception of the wallet request, the exchange computer system 100 executes a process that includes creation or assignment of a digital wallet (wallet) 232 that is or will be used by the trading party to trade assets as described herein. As also discussed herein, the digital wallet usually does not "hold" assets, but rather includes unique identifier(s) and one or more private key(s) are used to identify which trading party owns or is associated with a particular transaction that is part of the blockchain 116 (e.g., a blockchain transaction). The unique identifiers in the blockchain transaction may be used to link, identify, represent, or otherwise indicate which asset record (e.g., stored separately from blockchain 116 that is stored on blockchain computer system 214) belongs "in" which digital wallet.

As a variation of what is described above, in some embodiments, instead of step 230 involving in the creation of a new digital wallet, step 230 may instead involve the registration of previously-created wallet with the electronic exchange computing system 100. In such an embodiment, computing device A may receive user input from the user that indicates, for example, a walletID (e.g., a bitcoin address), a corresponding public key, and/or a corresponding private key; and at step 230, this information (i.e., the walletID, public key, private key, or other information) is transmitted by computing device A to the electronic exchange computing system 100 for storage in the digital wallet database 104.

Once the digital wallet is created (or otherwise registered) at step 232, the wallet information (or confirmation in the case of registration) may be transmitted to computing device A 120A for storage therewith. For example, the private, public, and/or generated blockchain addresses maybe transmitted to computing device A 120A. This data may be used later to generate and submit a transaction to blockchain computer system 214 and blockchain 116. As with other transmissions, to/from computing device A and B, those transmissions or steps may be to/from an intermediary computer system (e.g., the is operated by a broker) or may be internal API transmissions that are part of exchange computer system 100.

At step 236, computer device A transmits an electronic data message to the exchange computing system 100. The electronic data message includes a data transaction request for the exchange computer system 100 to carry out one or more tasks based on the content of the electronic data message. In certain examples, the data transaction request may be or include an order to "buy" or "sell" certain assets.

In certain example embodiments, the exchange stores a list of asset or type identifiers in database 118 and each of these identifiers corresponds to one or more types of assets or "types" of transactions that may be subject to an electronic data transaction request and/or order contained therein. In certain instances, all newly received orders reference or indicate one of the stored asset types and may thus be associated with the colored coins as discussed herein. In certain example embodiments the asset identifier may be a ticker symbol. In other example embodiments, the asset identifier may be a globally unique identifier (GUID) that corresponds to a ticker symbol. The order may also include information that indicates the trading party (i.e., the trading party account on whose behalf the order is submitted); this information may be or include a reference to a particular digital wallet of the trading party (e.g., Joe's wallet), and/or a specific walletID (e.g., a cryptographically generated identifier that is stored in the wallet). The order may also include the amount that is to be transacted, specific handling instructions for the order (e.g., a limit order, a market order, etc. . . . ), an amount of asset(s) the trading party wishes in return (this could include another type of asset, e.g., 10 shares of stock A for 10 shares of stock B, money such $10, an amount of crypto-currency, or other tradable items).

In step 238, the exchange computer system 100 performs a validation process on the order indicated in the received electronic data message. In some embodiments, this includes the exchange computer system 100 checking that the trading party for the order is associated with the items that the order is offering to trade. For example, if the order indicates that 100 shares of AAPL should be sold, then the exchange computing system 100 will query the blockchain system 214 to ensure that the trading party associated with the order owns (or has access to) 100 shares of AAPL. In other words, the exchange computer system 100 may automatically determine if there an unspent transaction (or multiple transactions) on the blockchain that the trading party (or its walletIDs) is associated with that meets or exceeds the 100 shares of AAPL. In connection with step 238, if this validation process fails (e.g., the trading party does not own 100 shares of AAPL), then the submitted order is rejected and a corresponding message is sent to computing device A 120A in step 240.

In certain example embodiments, the validation process of step 238 may alternatively or additionally include validations related to the particular asset. For example, the validation process may determine if the asset is one traded on the exchange computer system 100. The validation process may determine if the quantity or the price associated with the order or trade request is a valid value. In certain examples, the validations (e.g., the minimum/maximum price or quantity) may be based on the particular type of the asset which the order seeks to trade.

In step 242, if the order is valid, and as part of the order booking process, the exchange computer system 100 saves the newly submitted order to the order book 106. The exchange computer system 100 may then produce data associated with orders that are pending in the order book (see FIG. 3D). The exchange computer system 100 may also store the wallet information associated with the submitted order for later use by the exchange computer system 100. The wallet information may be stored as part of digital wallet 104 or in database 118 (e.g., that stores an express link between wallet information and data transactions requests).

In step 243, the exchange computer system 100 generates market data based on the order book (e.g., every time there is a change to the order book) and transmits the market data to computing device A 120A and/or other 3rd party computer systems. It will be appreciated that the market data feed may be a continuing process that is triggered whenever there is a change to the order book (e.g., a modification to an existing order, the addition of a new order, the match of two or more orders, etc.). Accordingly, new messages that are part of the market data feed may be generated and transmitted throughout the process of receiving, matching, or otherwise modifying orders that are present in the order book 104.

Figure 2B:
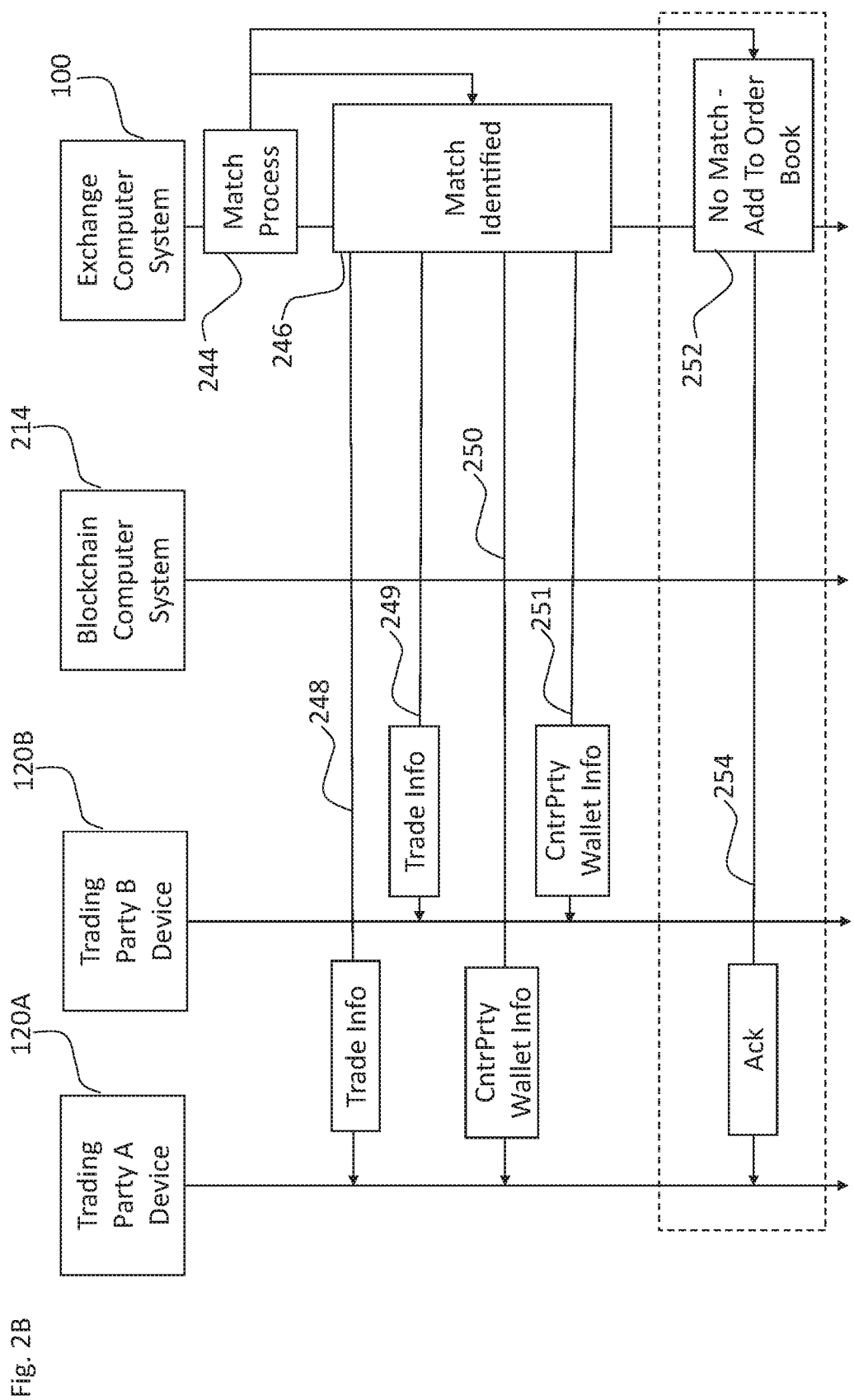

Turning to FIG. 2B, in step 244, a match process may be run against orders in the order book. The matching process identifies if there is a match between two or more orders in the order book. For example, a new received order "A" that is of size 10 may be matched against two contra-side orders that are each of size 5. In certain examples, each of the three parties to the identified trade may construct and submit a blockchain traction to the blockchain for validation thereon. In certain examples, the match process may be run each time a new order is received (either before or after the order is added to the order book). For example, a matching engine may be executed by hardware processor 102.

In step 246, should the newly received order (or a current order in the order book) be identified to match another order stored in the order book (e.g., based upon order handling and matching rules implemented by the exchange computer system 100 for the asset(s) being traded for), then the exchange computer system 100 notifies (in steps 248 and 249) each trading party (e.g., a computer device associated with users that corresponds to the trading parties) that a match has been identified and a trade will/is going to take place. This information may then cause (e.g., by using application software installed on the corresponding device) the client computer system (or other computer system) to generate and submit a blockchain transaction to the blockchain based on the received information. The notification includes details of the trade or transaction that is to be recorded (e.g., where one transaction represents a transaction from A to B, another transaction represents a transaction from B to A, and a trade is a collection or group of transactions, such as, B sends A quantity X of an asset and A sends B digital currency or another asset). In certain examples, the trade information includes an asset identifier and a quantity. The asset identifier and quantity may be included in the generated blockchain transaction. In certain example embodiments, the trade information may be associated with a unique identifier (a GUID) that is used to identify the trade that has been identified between A and B (e.g., a trade identifier). This information may be used by the exchange computer system 100 to subsequently correlate (e.g., as part of step 262) verified blockchain transactions to records stored by the exchange that the trade is pending or awaiting verification.

Then, the exchange computer system 100 applies a cryptographic hash to the wallet associated with trading party A (or to some data, such as the private key, contained within the wallet associated with trading party A), to generate wallet A hashed information. In step 251, the exchange computer system 100 transmits wallet A hashed information to computing device B 120B. Similarly, the exchange system 100 applies a cryptographic hash to the wallet associated with trading party B (or to some data contained within the wallet associated with trading party B), to generate wallet B hashed information. In step 250, the exchange computer system 100 transmits the wallet B hashed information to computing device A 120A. In certain examples, the hash that is used by the exchange computer system 100 may be based on information about the trade itself to verify that the parties exchange the agreed assets with each other. For example, the hash may be a function of data from wallet A and data from trade A.

In certain example embodiments, the electronic exchange computer system 100 transmits additional information to each of computing device A 120B and computing device B 120B that may include, for example, pending trade information regarding the trade agreed to by the trading parties. The information that is transmitted to computing device A 120B and computing device B 120B may then cause the corresponding computing device to generate and submit a blockchain transaction based on the received information.

In an alternative embodiment, the exchange computer system 100 communicates the hashed wallet information through an internal process such that when a transaction is submitted to the blockchain system 214 it is submitted from the exchange computer system 100 rather than, for example, computing device A 120A. In such an instance, the functional elements that are executed by computing device A 120A and computing device B 120B may be processed or executed by the exchange computer system 100 or another computer system that is operated by the entity operating the exchange computer system 100. For example, once a user has submitted an order from their corresponding device (or through the computer system of a broker), the exchange 100 may perform the subsequent steps related to completion of a trade and recordation in blockchain 116.

Should step 244, which includes the match process, fail to find a valid match for the order submitted by trading party 210, then the exchange computer system 100 may add the order to the order book 106 at step 252 and send an acknowledgement data message to computing device A 120A that the order is booked in the order book 106 of the exchange computer system 100 at step 254 where the process ends and the exchange computer system 100 may return to waiting for another order to be submitted (e.g., to step 236 or 238).

In certain examples, the exchange computer system 100 may also require a transaction fee. This fee may be generated as an additional blockchain transaction that is between trading party A or trading party B and an account that represents exchange computer system 100. In certain examples, this transaction may be completed and entered in the blockchain 116. For example, computing device A 120A may receive information (e.g., the public key of the digital wallet of exchange) from exchange computer system 100 to generate a blockchain transaction that will "transfer," for example, Bitcoin or some other asset from the digital wallet of trading party A to the digital wallet of the exchange. This generated blockchain transaction may then be submitted from computing device A 120A. The transaction fee may vary based on the type of asset being traded. In certain examples, the exchange computing system may support order modification and cancellation.

Returning to FIG. 2B, once computing devices 120A and 120B receive the trade and/or wallet information in steps 248, 249, 250, and 251, both devices begin the process of transferring the agreed upon assets to each other.

Figure 2C:
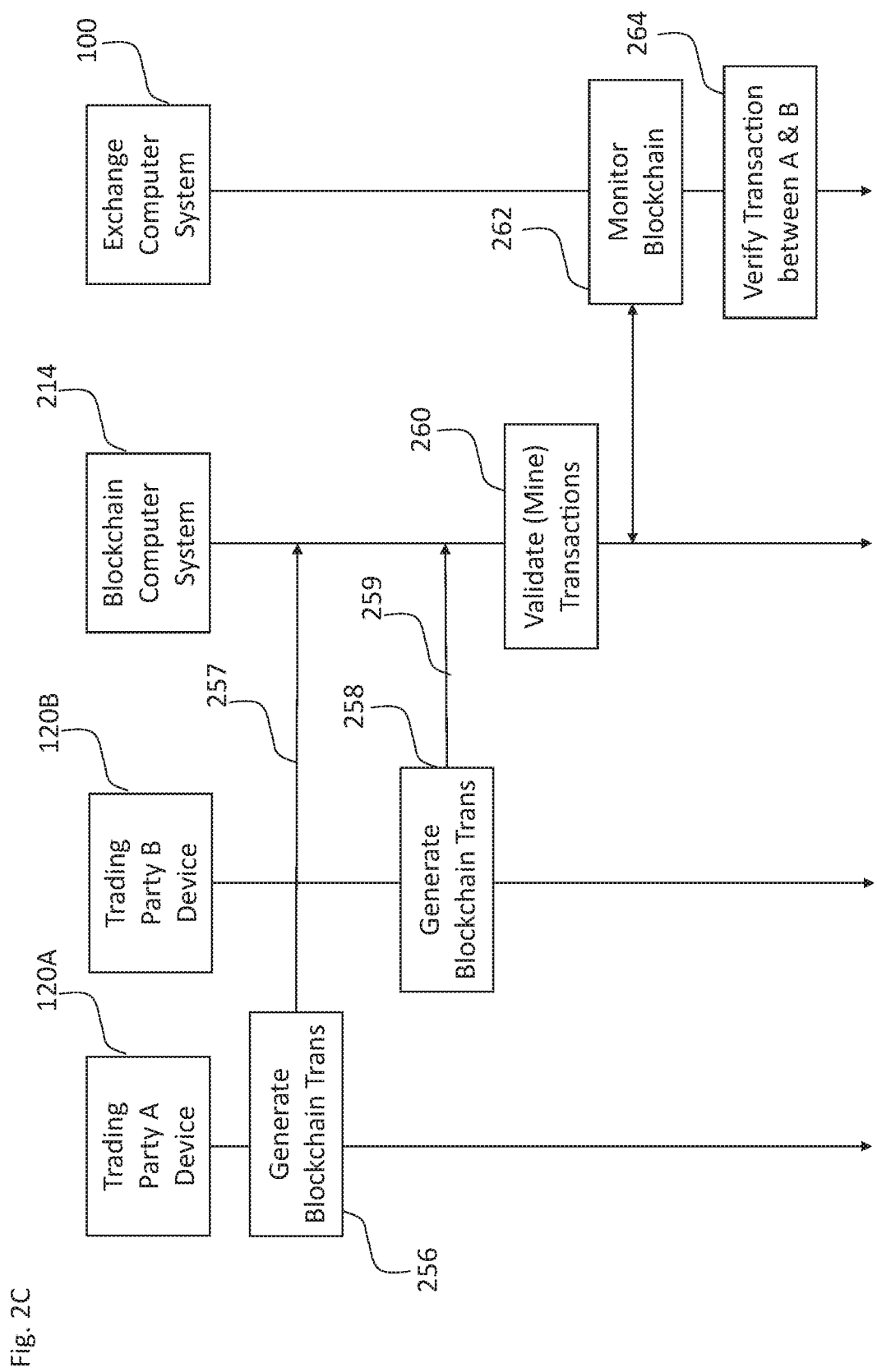

In FIG. 2C and in step 256, computing device A 120A generates a blockchain transaction using the previously received trade and/or wallet information (e.g., that includes information of trading party B's digital wallet) and transmits the generated blockchain transaction to blockchain computer system 214 at step 257. Similarly, computing device B 120B (the counter party) generates a blockchain transaction at step 258 and transmits the transaction to blockchain computer system 214 at step 259. For example, a transaction message is generated that specifies the transfer of assets (e.g., 100 shares of AAPL) from one trading party (e.g., A) to the hashed wallet information that is associated with the counter party (e.g., B). The counter-transaction (e.g., generated by computing device B 120AB) may specify the transfer of some other assets (e.g., USD, bitcoin, other asset types, etc. . . . ). The transaction and the counter-transaction make up the trade that was identified by the exchange computer system 100 in step 246.

In certain examples, the cryptographically hashed wallet information allows the trading parties to anonymously send the assets to each other by using the blockchain. Anonymity is maintained because the sending trading party will not be able to determine the receiving trading party because it is mathematically infeasible for a third party to determine the underlying wallet (e.g., the trading party) that the hashed wallet information is associated with. Instead, only the exchange computing system and the trading party (along with $3^{rd}$ parties notified by either of these entities) will know who is associated with the hashed wallet information. Further, hashed wallet information may be generated for each new potential match. Thus, a wallet may be associated with many different blockchain transactions and/or hashes to make up the whole of what is "owned" by a given trading party. For example, the wallet associated with Trading Party A may have a different blockchain address generated for each of the identified matches. Only Trading Party A (and the exchange system and any party notified by the exchange system or trading party A) may have a complete view as to what transactions or assets are associated with the digital wallet of Trading Party A.

In certain example embodiments, the exchange computer system 100 may formulate and submit the transactions to the blockchain computer system 214 for inclusion into the maintained blockchain 116. In other words, the exchange computer system 100 may act on behalf of the trading parties to complete the trade and write the trade to the distributed ledger that is the blockchain 116. In certain example embodiments, a trading party (e.g., a user, a broker, etc.) provides input to a computing device (e.g., computing device A 120A) and a corresponding electronic data message is generated using a software application installed on that device. The generated electronic data message is then transmitted to, for example, exchange computer system 100. Similarly, a trading party that "receives" electronic data messages in fact receives such messages on a corresponding computing device that is being used by the trading party.

In step 260, the transactions submitted by computing device A 120A and computing device B 120B are "mined" by individual nodes that make up the blockchain computer system 214 to validate the submitted transactions and are eventually written to the blockchain 116 (e.g., the public or private ledger). Generally, once a blockchain transaction is submitted for verification it is received by one or more of the computer nodes (e.g., individual computers that may each correspond to the architecture shown in FIG. 5) within the blockchain computer system 214. Once received by a node, that node will propagate the blockchain transaction to other nodes within the blockchain computer system. Each node then performs a mining process on the transaction (or a group of transactions called "blocks"). The mining process is a process for solving a computationally difficult problem that is also easy to verify. In some embodiments, this includes solving a cryptographic hash algorithm or function. The solution to the problem is generally called a proof of work and is included with the transaction or block of transactions as a record that transaction has been "solved" or verified. Accordingly, once a new block for the submitted transactions is generated and verified into the blockchain it is part of the blockchain.

In step 262, the exchange computer system 100 monitors (e.g., continuously monitors) the blockchain of the blockchain computer system 214 for trades that are pending (e.g., marked as pending by the exchange computer system 100) and have been submitted to the trading parties for completion on the blockchain. For example, when a new block of the blockchain is completed (and thus published to all nodes of the blockchain system), the exchange computer system 100 determines if the earlier provided hashed wallet information, which may now be part of the new block of the blockchain is present therein. In certain example embodiments, the exchange computer system maintains a local copy of the blockchain in local memory for this process. For example, the exchange computer system 100 includes processing resources (e.g., CPUs, GPUs) that are used to "mine" blockchain transactions. Accordingly, one or more nodes of the exchange computer system may be included in the exchange computer system 100

In step 264, the exchange computer system 100 determines if both trading parties have exchanged the correct assets. In other words, the exchange computer system 100 determines if transactions exist in the blockchain 116 that show transactions that correspond the previously matched orders.

In conjunction with verifying the blockchain data (e.g., if an exchange has taken place), the exchange computer system 100 also updates a transaction log, appropriate ledgers, and creates new audit log entries in step 265. This information can then be used to produce Consolidated Audit Trail (CAT) information that may be stored in database 118.

Figure 2D:
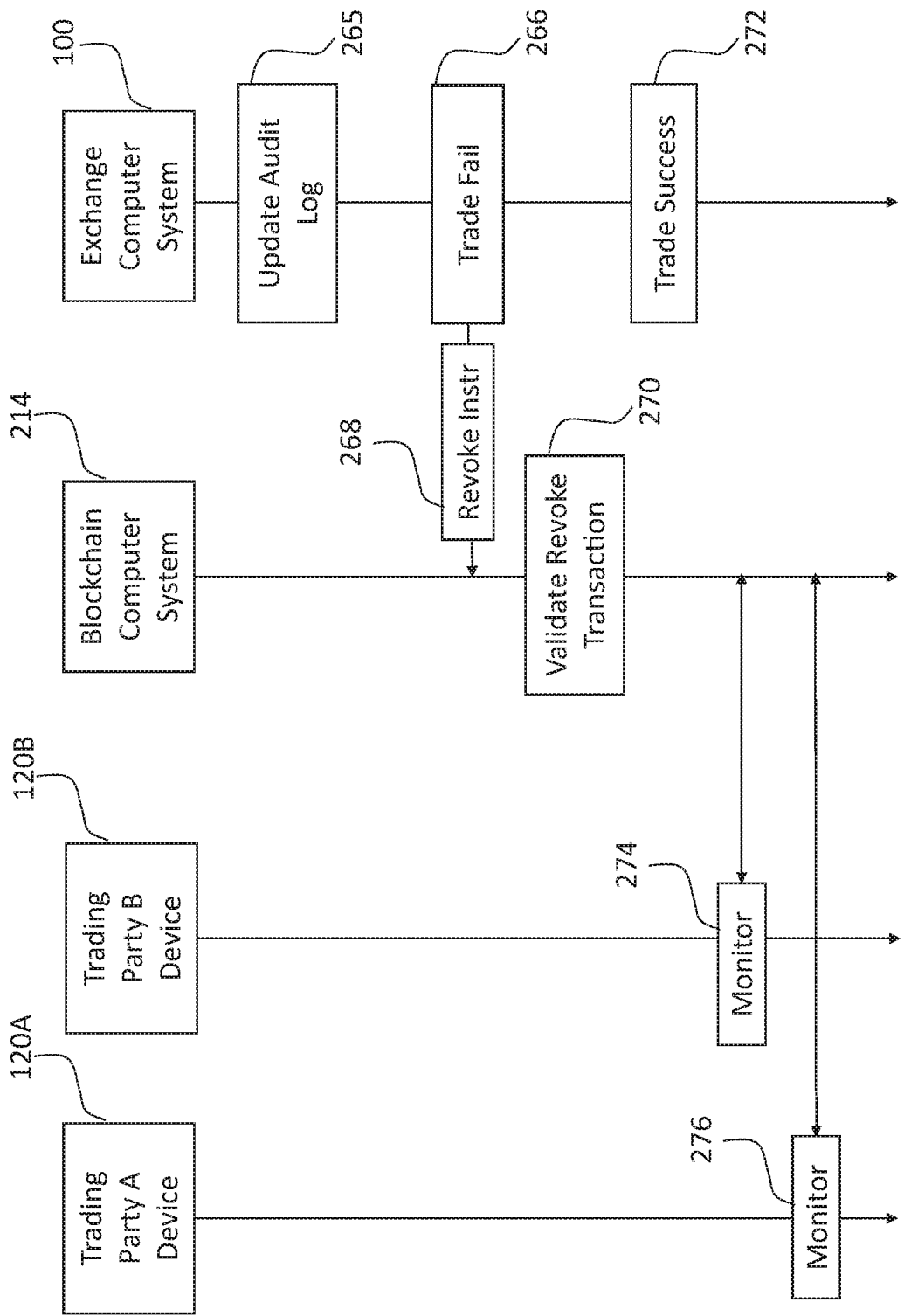

In FIG. 2D and in step 266, if the exchange computer system 100 determines that either trading party has failed to transfer the agreed to assets in an agreed upon timeframe, the exchange computer system 100 may issue a data instruction to the blockchain that revokes any partial or failed transaction in step 270, which then returns the assets to their original owners. In certain example embodiments, this revocation process may be built into the submitted transactions (e.g., as a script that is part of the generated blockchain transactions) or may be another transaction that transfers an asset back to the original owner.

In certain example embodiments, the electronic exchange computer system 100 indicates the "broken" trade to each party and removes the pending trade from the order book (e.g., both orders may be placed back into the order book as normal). In certain examples, the time frame for completion of an order will be determined by the electronic exchange computer system 100 based on the type of asset or may be provided in the order handling instructions received from a trading party. For example, if the exchange computer system 100 has not verified a complete trade (e.g., one transaction from A to B and another from B to A), it may automatically generate a new blockchain transaction that revokes any portions of the trade. For example, if a transaction from A to B is included in the blockchain, but a transaction from B to A is not present, the exchange computer system may generate a counter blockchain transaction that returns the assets that were "transferred" as a result of the A to B transaction.

In step 272, if the correct assets have been exchanged, the electronic exchange computer system 100 removes the pending trades associated with this completed trade from the order book 106, marks the trade complete, produces market data indicated the trade (e.g., step 243), and/or reports clearing and settlement to the depository of the given asset(s). In certain example embodiments, the exchange computer system 100 may wait for a certain number of blocks to be subsequently generated after the block that includes the transactions. For example, the exchange may wait until the block with the transactions in questions are at least five levels deep in the blockchain. These subsequent blocks act to further verify transactions have been completed and cannot be tampered with (due to the verification of every block depending on the proof-of-work of the prior block).

As part of the blockchain process, a miner's computer system may update its wallet with a mining fee associated with the transactions that have been mined for the blockchain. In certain examples, the blockchain system may be privately operated (e.g., by the operator of the exchange) and this fee may be a transaction fee charged by the exchange computing system 100 (as described above).

In steps 274 and 276, each trading party monitors the blockchain and updates the view that the respective wallets provide of the blockchain to indicate the assets now held by the corresponding trading party.

FIGS. 3A-3I

FIGS. 3A-3I is a series of illustrative diagrams that show processes that may be performed as part of a blockchain based exchange computer system according to certain example embodiments.

Figure 3A:
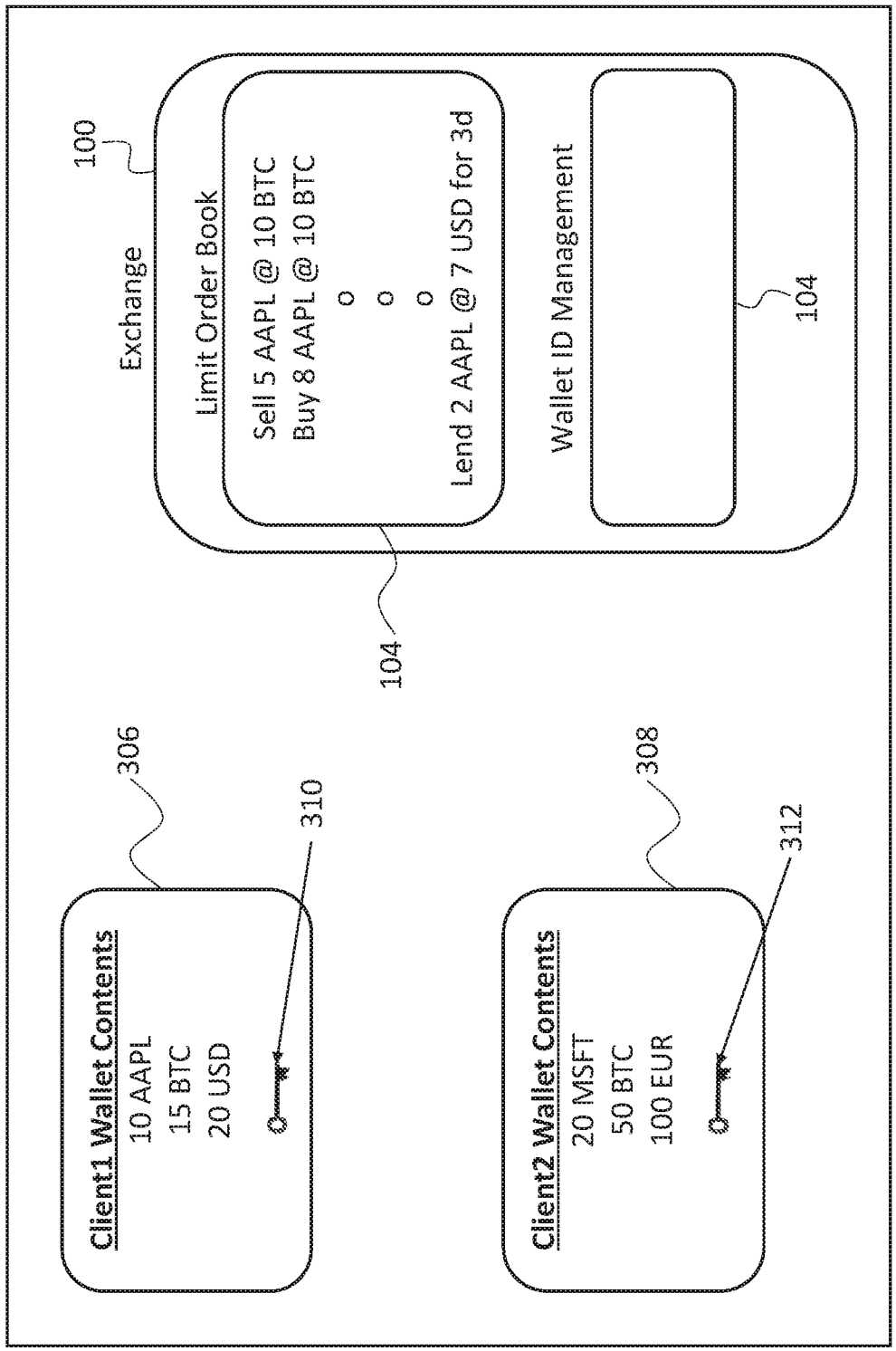

In FIG. 3A, exchange computer system 100 includes order book 104, which stores pending orders, and digital wallet storage 104 that is stored in volatile or non-volatile storage (e.g., RAM or on disk). A digital wallet 306 for client1 includes a wallet identifier 310. As described herein a digital wallet (e.g., 306 and 308) is a software program that can be installed on a client computer system operated by a (e.g., user device 120A), a broker computer system, the exchange computer system 100, or some other computer system that allow a client or trading party to interact with the contents of the wallet (e.g., wallet identifier 310 or a private key). Similarly, digital wallet 308 for client2 includes wallet identifier 312. Both wallet 306 and 308 contain assets that are associated with that wallet. As explained herein, the wallets do not actually "contain" the assets in question (e.g., like a physical wallet would contain a $10 bill), but rather hold a key that is used to show proof of ownership for a transaction that is part of the blockchain. The assets in question may be associated with particular transactions within the blockchain that are tracked and managed by exchange computing system 100.

In the following examples, digital wallets 306 and 308 are stored on client computer system (e.g. user device 120A or 120B, which may also correspond to a computer described in connection with FIG. 5). Accordingly, when a wallet sends or receives data messages (or client1 or client2 "send" or "receive"), the sending and receiving functions may be performed by a corresponding transceiver of the user computer system that is storing the digital wallet data and executing the digital wallet application program. However, as explained herein and in alternative embodiments, digital wallets may also be stored and executed on exchange computer system 100.

Figure 3B:
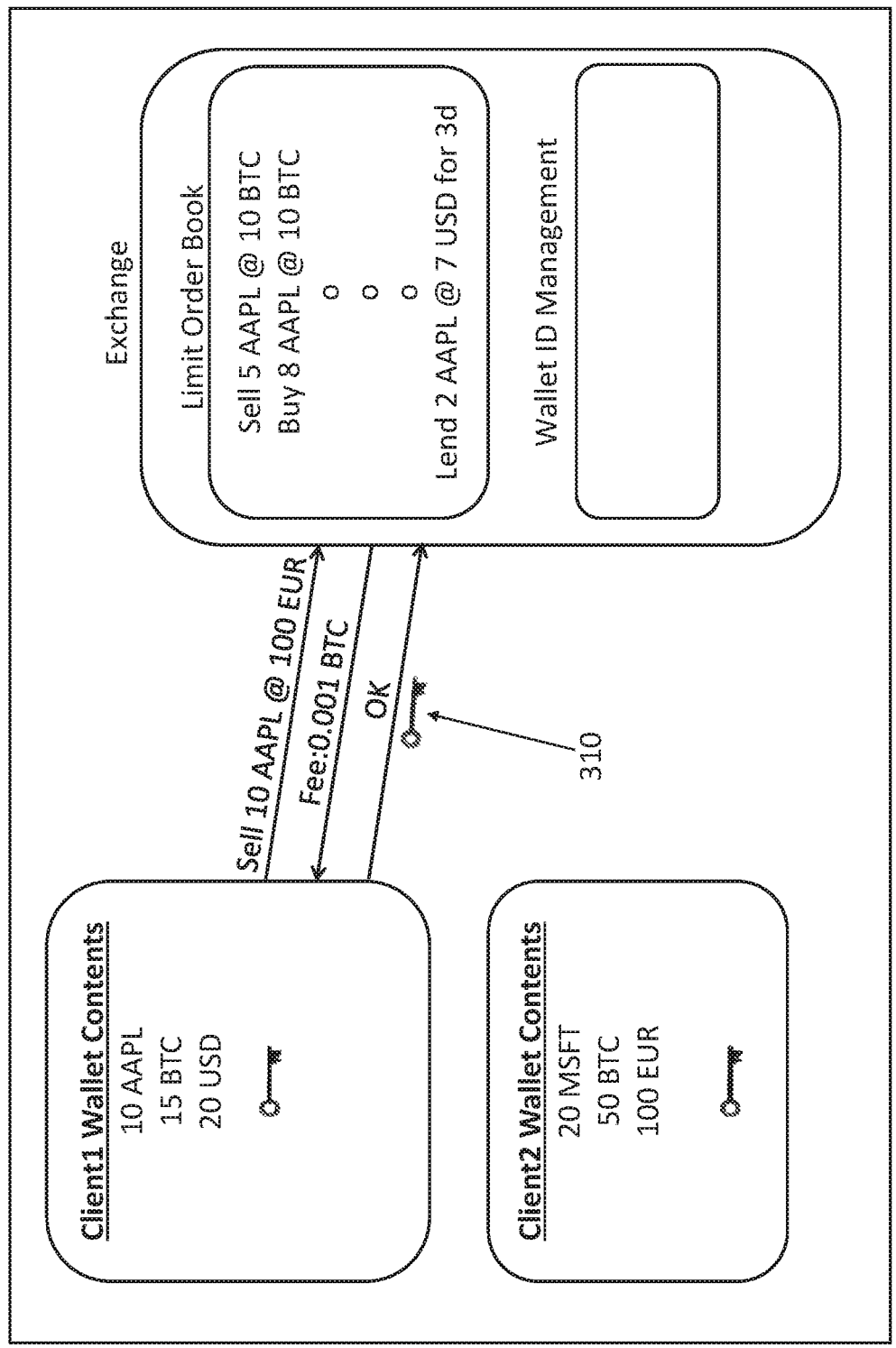

In FIG. 3B, wallet 306 sends an electronic data message to exchange computer system 100 with an instruction to sell 10 AAPL @ 100 EUR. Exchange computer system 100 responds to this message with a small transaction fee of 0.001 BTC, which the client computer system of client1 submits to the blockchain, thus transferring 0.001 BTC to the digital wallet of exchange computer system 100. Also included in the electronic data message transmitted exchange computer system 100 is wallet identifier 310. As explained herein wallet identifier 310 may include the private key or other identifier or data. For example, the wallet identifier 310 may be or have been generated based on the private key (e.g., generated as a result of an elliptical curve encryption algorithm) of client 1's digital wallet.

In certain examples, a view of a digital wallet is provided on a client computer system (e.g., a smart phone) and the digital wallet (e.g., that contains public/private keys, identifiers, etc. . . . ) is stored on exchange computing system 100. Thus, electronic data messages transmitted from a computing device of a trading party may simply provide an order to sell an amount of shares of stock A and the exchange computing system 100 (or another computing system) may determine the specific blockchain related elements that need to be generated and formatted in order for the order to be successfully placed according to the techniques described herein.

Figure 3C:
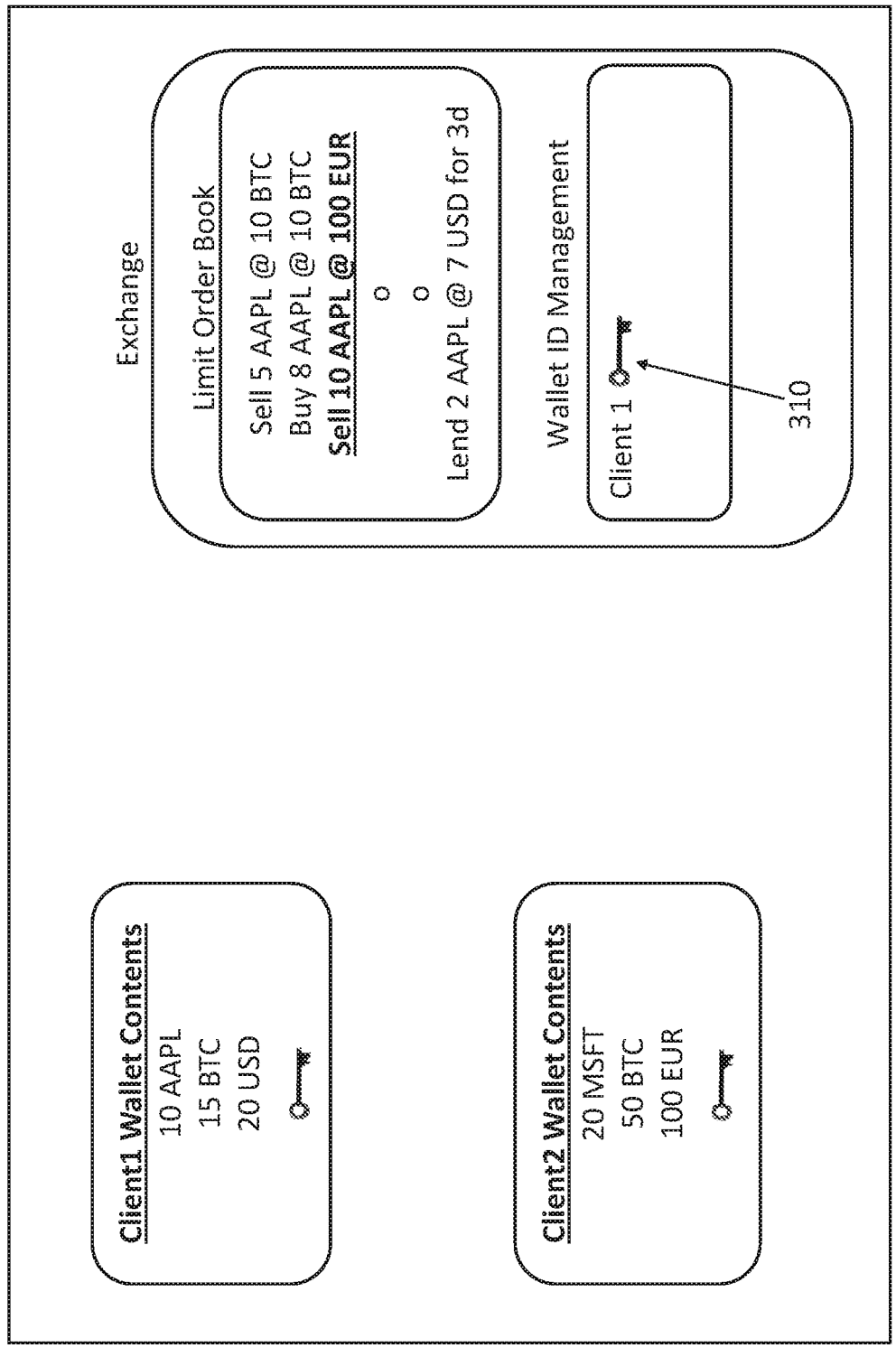

In FIG. 3C, the electronic data message sent from client1 (or the contents thereof) is stored to the exchange computer system 100. In particular, the order to sell 10 AAPL @ 100 EUR is added to the order book and the wallet identifier 310 is added to wallet management of the exchange 100.

In certain examples, the wallet storage of exchange 100 may be backed by hardware that is integrated with an enterprise hardware security module (HSM).

Figure 3D:
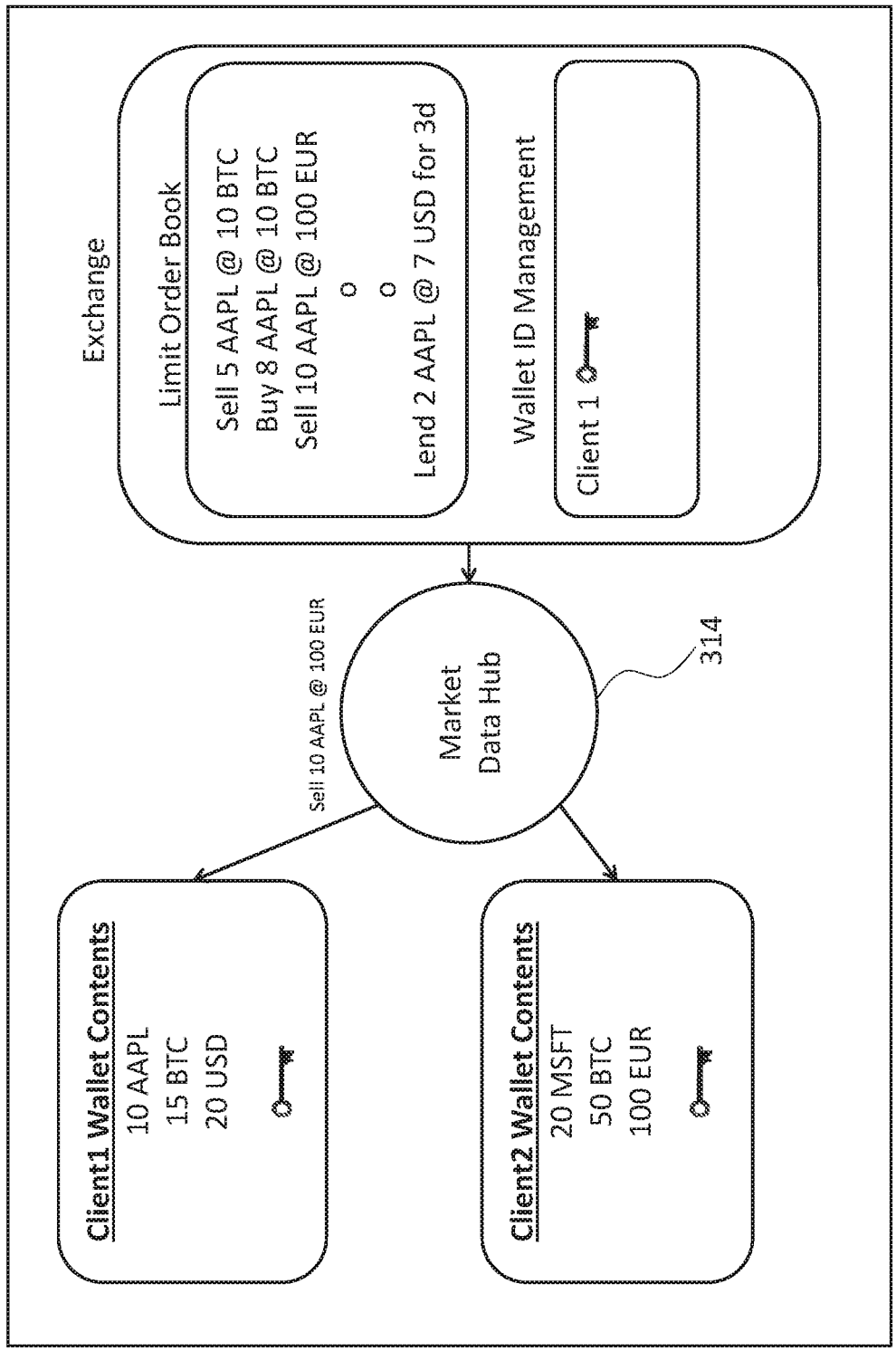

In FIG. 3D, data (e.g., market data) regarding orders or electronic messages that are in the order book 104 may be produced by exchange computing system 100 and delivered to remote computing clients via market data hub 314. In certain examples embodiments, a real-time feed such as TotalView-ITCH from Nasdaq may be used. Such a market data hub may facilitate ease of connectivity by a broader marketplace and provide a single version for the data that is being viewed by client. In certain examples, it may also be a data source for smart contracts.

Figure 3E:
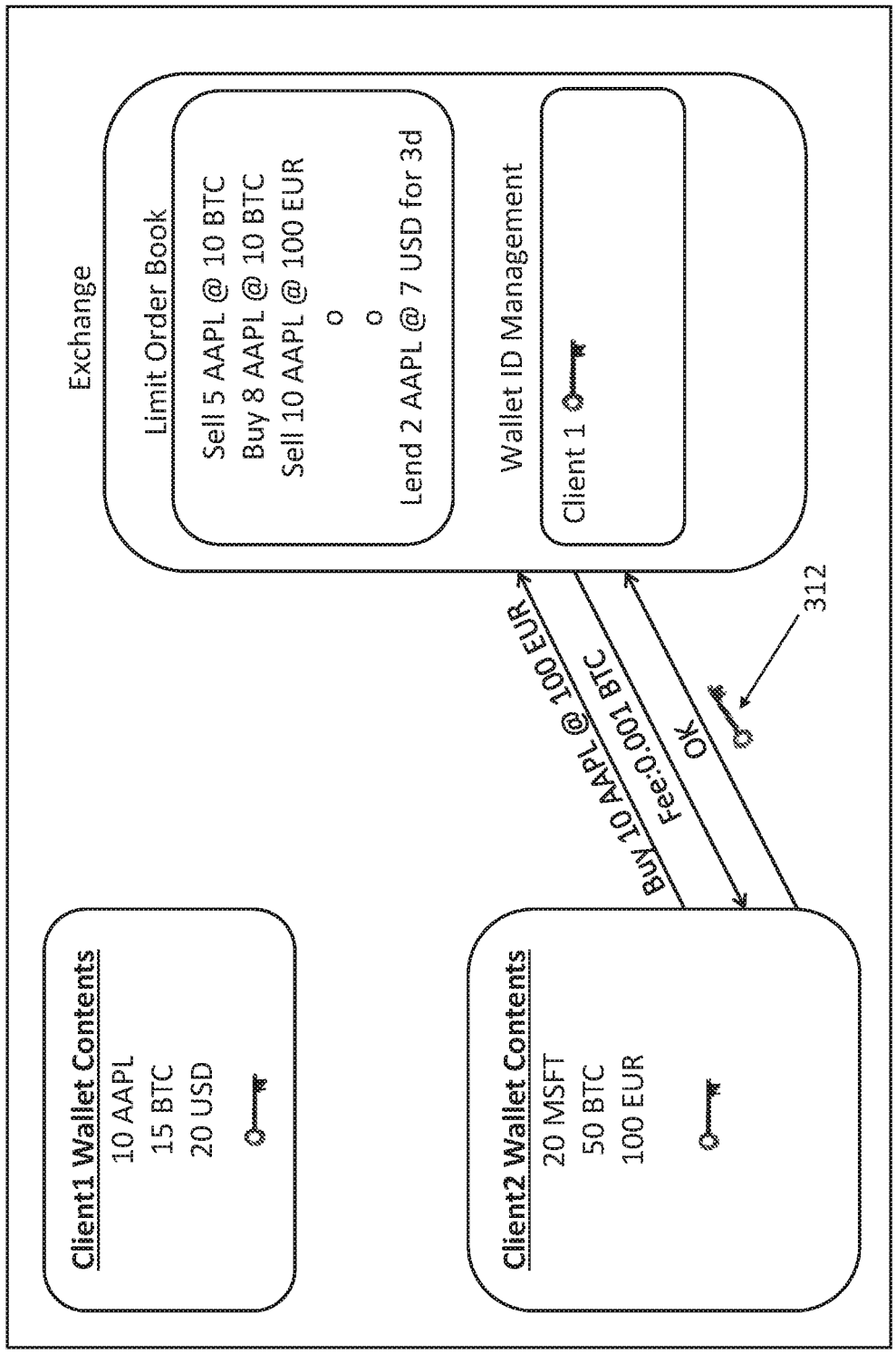

In FIG. 3E, client2 transmits an electronic data message with an order (e.g., a data processing instruction) to buy 10 AAPL @ 100 EUR. This electronic data message also includes wallet identifier 312 of digital wallet 308 of client2. As with the prior order, exchange computer system 100 responds with a transaction fee of 0.001 BTC that is subsequently processed against the blockchain (thus transferring the 0.001 fee to digital wallet of exchange computer system 100).

Figure 3F:
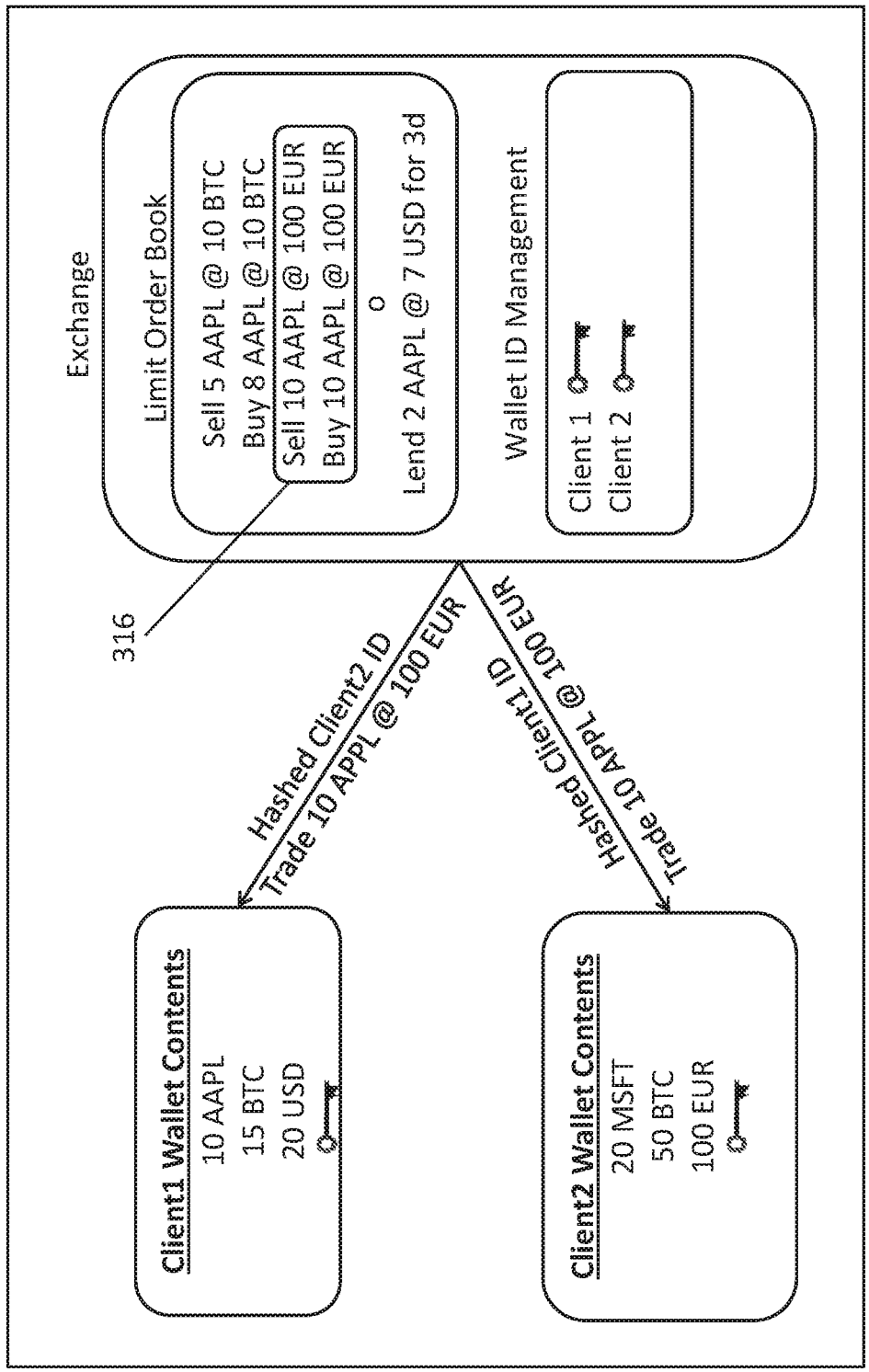

In FIG. 3F, the wallet identifier for the digital wallet of client2 is added to the wallet storage 104 of exchange computer system 100 and the buy order included in the electronic data message submitted from client2 is added to the order book (or alternatively the matching engine of the exchange 100 attempts match the newly received order with any existing orders that are resting in the order book). The matching engine of the exchange computer system 100 then identifies trade opportunity 316. In response to identifying the trade opportunity, exchange computer system 100 hashes the clientIDs (e.g., a hash of all or some portion of wallet information associated with the respective clients) associated with the respective orders to create cryptographic hashes. These cryptographic hashes are then transmitted to the respective counterparty for the identified trade. Thus, the client computer system associated with client2 receives a hashed version of the client1 identifier and the client computer system associated with client1 receives a hashed version of the client2 identifier. In certain example embodiments, responsive to the identified trading opportunity, both orders are removed from the order book and placed into a pending transaction list (or marked pending in the order book).

Advantageously, the cryptographic hash of the client IDs allows each client to complete a transaction on the blockchain in an anonymous manner and also may prevent the respective counterparties from forming a direct bi-lateral exchange for future trades.

In certain example embodiments, the exchange computer system 100 is sent (e.g., in the form of an electronic data message) an agreed upon transaction fee from each client. The transaction fee may also be submitted to the blockchain (e.g., in the form of Bitcoin or another colored coin) so that the fee moves from each party's digital wallet to the digital wallet of the exchange computer system 100 (or another digital wallet). This blockchain transaction may occur at the time an order is initially received from a client, at the time of the trade, or both. In certain example embodiments, transaction fees for clearing and settlement services may also be applied. In other words, a single "transaction" (e.g., as shown in FIGS. 3A-3I) may involve or include the generation of multiple separate blockchain transactions that are submitted to the blockchain for inclusion thereon.

In certain example embodiments, exchange computer system 100 may implement a multi-signature feature which would allow the exchange computer system 100 to "break the trade" should either party fail to deliver. In particular, a generated blockchain transaction may require two different keys to show "ownership" of the outputs for the transactions. For example, a transaction from A to B may require B's key and the key of another third party (e.g., the exchange, the company associated with the underlying asset, or a regulatory authority) before B can "spend" or further transact the asset associated with the transaction. In certain example embodiments, a generated blockchain transaction may require a threshold number of keys from a total number of possible keys to unlock a blockchain transaction (e.g., to spend the outputs of that transaction). For example, 4 different keys may be used unlock a transaction and the transaction may be unlocked by 2 or more of the 4 required keys.

In certain example embodiments, the exchange computer system 100 may create and/or maintain an escrow digital wallet. In such an embodiment, client1 may use client2's wallet identifier (or a hashed version thereof) as well as the wallet ID associated with the exchange computer system 100 to create a multi-signature address (e.g., that references the escrow wallet). Conversely, client2 may use client1's wallet ID (or a hashed version thereof) as well as the wallet ID of the exchange to create a counter transaction. When both orders are submitted and transferred to the escrow wallet (e.g., by appropriately formulated blockchain transactions), another blockchain transaction may be used to "move" the assets from the escrow wallet to the counter party's wallet. Should either fail, then the exchange computer system 100 can return the assets from the escrow wallet to the originating party by creating an appropriate blockchain transaction.

Figure 3G:
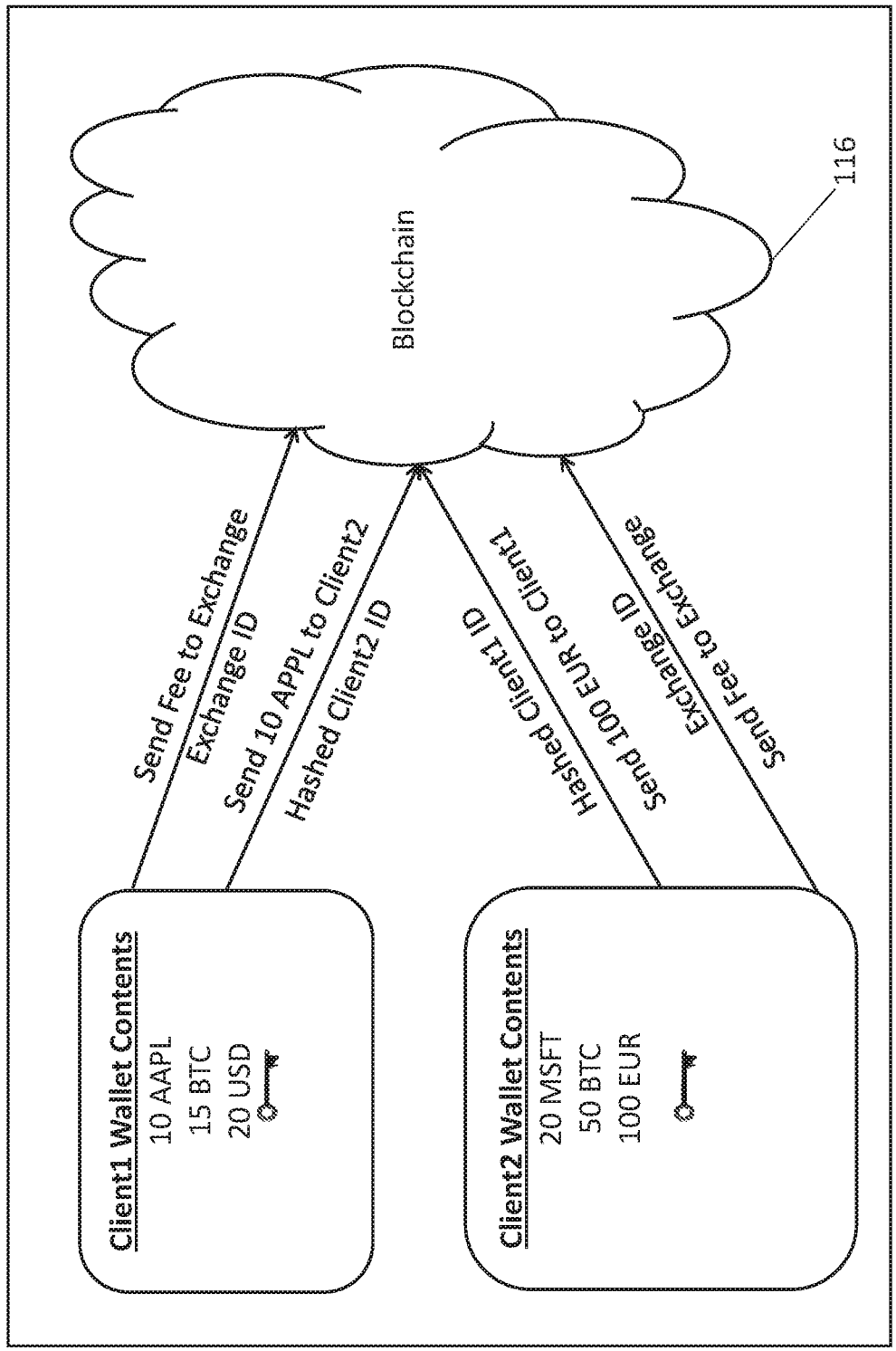

In FIG. 3G, after receiving the hashed clientIDs from exchange computer system 100, the client computing devices of client1 and client2 interface with blockchain 116. In certain example embodiments, the blockchain can be a privately managed blockchain (e.g., managed by the entity that is running exchange computing system 100) or may be a public blockchain (e.g., like that run for Bitcoin).

In any event, the computing devices of client1 and client2 send transactions to one or more nodes of the blockchain computer system 214 for processing (e.g., to be added to the blockchain 116). In certain examples, the transaction may be related to bitcoin amounts (e.g., in the case of a fee from a client to the exchange). In certain examples, what is known as a "colored-coin" is used to represent assets that are listed by exchange computing system 100. Exchange computer system 100 may store a mapping of hashed wallet keys (e.g., clientIDs) to corresponding transactions performed on the blockchain.

As indicated above, the transactions may be submitted to the blockchain 116 from exchange computer system 100 on behalf of computing devices from client1 and client 2. In other words, the clients may only be used for the initial order submission.

Transactions submitted to blockchain computer system 214 are "mined" by miners as described above (e.g., computing systems that perform cryptographic processes to verify the transaction) and the result of this mining is a new block that is linked into the blockchain. Once the new block that includes the submitted transaction has a "proof-of-work" determine it is then validated and considered part of the blockchain.

Figure 3H:
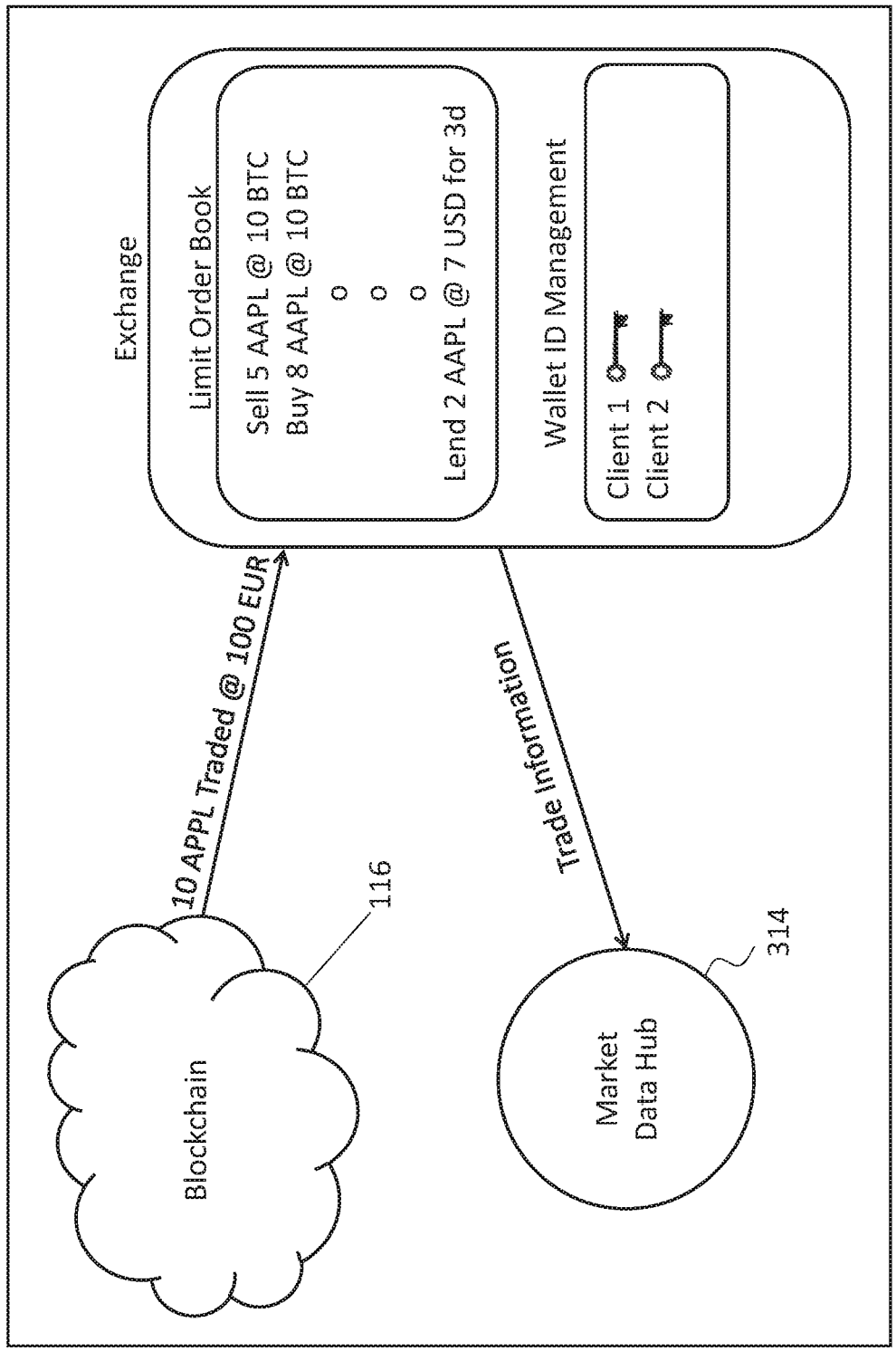
Figure 31:
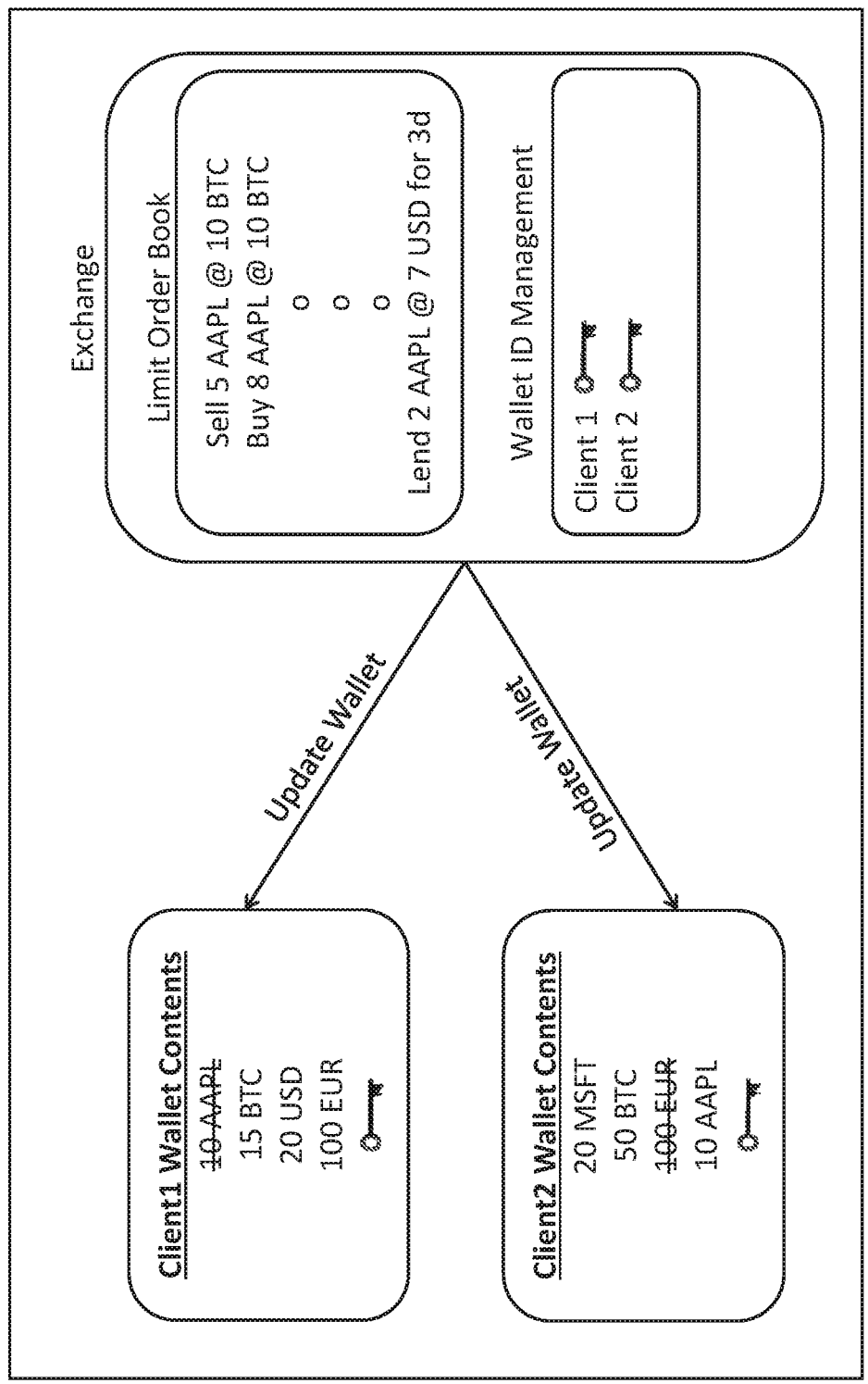

Turning to FIG. 3H, exchange computer system 100 identifies trades that have been included in the blockchain. This may be accomplished by identifying transactions that are part of the blockchain and associated with the previously generated hashed clientIDs. In certain examples, a notification agent (e.g., software running on the exchange computer system 100 or another piece of computing hardware) may be used to detect and report when such hashed identifiers are identified on the blockchain 116 and associated with certain transactions. Once a transaction is noticed as being in the blockchain 116 the exchange computer system 100 may trigger one or more processes. As discussed in connection with FIGS. 2A-2D, a report of settlement and/or record of the transactions may be forwarded to regulatory authorities or depositories. The exchange computer system 100 may remove the pending orders from the order book (or other memory) as the transaction is now recorded to the blockchain. Also, the exchange computer system 100 may disseminate data regarding the transaction(s) to market data hub 314. This data may also be used to drive existing back office systems (e.g., C&S, FINRA, etc.)

In certain example embodiments, access to the market data hub may adopt a market micropayment (e.g., of cryptocurrency) structure. For example, customers may be charged a fee per query. In other examples, customers that ask for notification of market data (e.g., for a particular security) may be charged a fee when a notification stream is established. The fee may be per notification or another transaction model.

It will be appreciated that identifying that a transaction is in the blockchain 116 may include waiting until a certain number of blocks have been added to the blockchain 116. Such a process will ensure the transaction is irrevocable as it would not be possible (or at least technically infeasible) to modify a transaction included in a block that is at least several layers deep within the blockchain 116 because the cryptographic proof of work of each block depends on the cryptographic proof of work of the prior blocks. In certain example embodiments, a trade may be considered finalized or settled after a certain number of blocks have been added to the blockchain. For example, 6 blocks may be added to the block chain, with each new block increasing the validity of the transactions from the prior blocks.

Such a settlement and clearing process may take approximately 1 hour in certain instances. It will be appreciated, that this is faster than trade settlements in traditional electronic exchanges (e.g., 2 to 3 days). In certain example embodiments, the settlement and clearing process may be less than one hour depending on the implementation of the blockchain. For example, a blockchain that is maintained by a private distributed network may be able to process transactions more quickly due to decreased security concerns (e.g., there may be a relatively lower risk of double spending). Further, the type of implementation for the blockchain (e.g., the hashing process associated with proof of work) may vary and thus the corresponding time to verify a transaction may be adjusted.

While the transactions associated with asset transfers are being mined, fees that are charged by exchange computer system 100 may also be mined and incorporated into blocks of the blockchain (e.g., resulting in payment moving from the wallet of, for example, client1 to a wallet associated with exchange computer system 100).

In FIG. 3I, after a transaction(s) is recognized on the block chain, the corresponding contents of a wallet are updated. Here, 10 AAPL is "removed" from the wallet of client1 and 100 EUR is added. In contrast, 10 AAPL is added to the wallet of client2 and 100 EUR is removed. In other words, software that interfaces with the digital wallet storage may update a wallet view with the settled trade information.

In certain example embodiments, the need for RegSho practices may be obviated due to the elimination of naked short selling. In other words, clients would not be able to trade unless they could show they "owned" a particular security.

In certain examples embodiments, the colored coins could represent equities and be loaned or borrowed on the exchange. FIG. 3H shows an example of this where an order of "Lend 2 AAPL @ 7 USD for 3 d" is listed. Such an order may be matched against a corresponding "borrow" order and executed in manner similar to the trades described herein. 2 AAPL shares would move between the clients in exchange for 7USD by using the blockchain. Further, the blockchain transaction for this "trade" would have information encoded in the transaction itself that the 2 AAPL shares would revert to the original owner in 3 days (e.g., a condition that is incorporated into the script used to unlock the outputs for a given blockchain transaction). Such systems may eliminate short selling as the party borrowing the security would actually need to have that security in their wallet before use. In certain example embodiments, fee related transactions may be generated and submitted to the blockchain to effectuate such temporary transfers. In certain embodiments, this behavior can be affected through the use of a smart contract.

This technique may be used to finance positions and facilitate a create/redeem function. In general, create/redeem functions may involve the issuer of the asset. As such, the exchange computing system may verify that the trading party and issuer have the assets required for the conversion by querying or interrogating the blockchain. The wallets of the trading party and the issuer may then be involved in a transaction in the same way as described for the exchange of other assets.

FIG. 4

FIG. 4 illustrates a process to performing transactions against a blockchain according to certain example embodiments. In step 402, client computer system 1 401 (e.g., a computer being used by Alice) issues a data processing instruction that includes a sell order for 1 APPL @ $127. This order is for a trading account associated with Alice who has a digital wallet setup with exchange computer system (exchange) 100. Exchange 100 receives the order and produces order data responsive to that reception. The order data 402a may indicate a sell interest in AAPL. This information may be transmitted out to 3rd parties using a market data feed.

In step 404, client computer system 2 403 issues a data processing instruction that includes a buy order for 1 APPL @ $127. This order is from a trading account associated with Bob who also has a digital wallet setup with exchange computer system 100. Exchange 100 receives the order and produces order data in response. The order data 404a is then disseminated to external clients (or internal systems).

In step 405, a match is identified for the order in the order book (or the order book being matched against a newly received order). A matching process may be executed by a matching engine running on exchange 100 to identify the match in step 405.

In steps 406a and 406b, exchange 100 generates unique hashed wallet) Ds for each trading party (Alice and Bob) and sends the hashed walletID of the other trading party along with pending trade information to the indicated client computer systems (e.g., Alice's system receives Bob's information and Bob's system receives Alice's information).

In step 408, client computer system 401 generates a new blockchain transaction and uses an interface (e.g., a software application that is installed on client computer system 401) to generate and send a transaction to blockchain computer system 214. This generated blockchain transaction also includes a transaction fee (e.g., a mining fee) of 1000 Satoshi (e.g., a crypto-currency). The transaction includes reference to a colored coin that encapsulates 1 AAPL share (e.g., the colored coin includes an identifier for AAPL along with a quantity of 1). In certain example embodiments, the transaction is "sent" to the hashed walletID (or hashed ID of Bob's digital wallet or the contents thereof).

In step 410, client computer system 2 403, like client1, generates a new blockchain transaction and uses an interface to blockchain computer system 214 to send the generated transaction that includes the 1000 Satoshi transaction fee. This transaction is to Alice's digital wallet and includes a colored coin that encapsulates the $127 that is part of the identified trade. In certain example embodiments, the transaction is "sent" to the hashed walletID of Alice.

In step 412, the two transactions are mined by nodes of the blockchain computer system 214 and then added to the blockchain 116. As a result of the mining, exchange 100 collects a 2000 Satoshi transaction fee (e.g., because the mining was performed by computing nodes that are part of the exchange 100 that maintains the blockchain.

In step 414, exchange 100 produces market data that indicates the assets subject to the trade (1 APPL share and $127 USD) have been traded. Exchange 100 may also update the wallet contents of Alice and Bob to reflect the new ownership of the two elements.

FIG. 5

FIG. 5 is a block diagram of an exemplary computer system 500 according to certain example embodiments (e.g., an exchange computer system as described in FIGS. 1-4, a user or remote computing device as shown in FIG. 1 or FIGS. 3A-3I, a computing node that is part of a distributed computer system used to process and maintain a blockchain, one computer system out of multiple computer systems that make up an exchange computer system as described herein, etc. . . . ). Computer system 500 includes a processing system 502 with CPU 1, CPU 2, CPU 3, CPU 4, a system bus 504 that communicates with RAM 506, and storage 508. The storage 508 can be magnetic, flash based (e.g., for a mobile client device), solid state, or other storage technology. The system bus 504 communicates with user input adapter 510 (e.g., PS/2, USB interface, or the like) that allows users in input commands to computer system 500 via a user input device 512 (e.g., a keyboard, mouse, touch panel, or the like). The results of the processing may be displayed to a user on a display 516 (e.g., an LCD) via display interface 514 (e.g., a video card or the like).

The computer system 500 may also include a network interface 518 (e.g., a transceiver) to facilitate wired (e.g., Ethernet—802.3x) and/or wireless communication (WiFi/802.11x protocols, cellular technology, and the like) with external systems 522, databases 520, and other systems via network 524. Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

External systems 522 may include other processing systems, systems that provide third party services, computing nodes such as miners for the blockchain, etc. External systems 522 may be client devices or server systems.

External systems 522 may also include network attached storage (NAS) to hold large amounts of data. External systems, along with the internal storage and memory, may form a storage system for storing and maintaining information (e.g., order book information, routing strategies, etc. . . . ). Such a system may communicate with users and/or other computer systems that process electronic order data messages. The database 520 may include relational, object orientated, or other types of databases for storing information (e.g., order book information for a financial instrument).

The computer system may be arranged, in various embodiments, in many different ways. As just one example, the computing system may be arranged such that processors include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip or a "system-on-chip"). As another example, the computing system may be arranged such that: the processors include two, three, four, five, or more multi-core processors; the network interface devices include a first network interface device that implements Ethernet and a second network interface device that implements WiFi and/or Bluetooth; and the memory devices include a RAM and a flash memory or hard disk.

In other words, the processes, techniques, and the like, described herein (for client devices, server, exchange, and/or controller systems) may be implemented on a computer system. Such implementations may then configure or program the processing system to carry out aspects according to certain example embodiments. It will be appreciated that other architecture types may be used. For example, a single CPU may be used instead of multiple CPUS. Alternatively, a processing system may include multiple CPU "cores." Further, the various elements shown in connection with FIG. 5 may be included into one cohesive physical structure (e.g., such as a tablet device). The components and functionality shown in FIGS. 1-4 may be implemented on or in conjunction with the example computer system shown in FIG. 5 (e.g., to thereby create a specific purpose machine).

As described herein when a software module or software process performs any action, the action is in actuality performed by underlying hardware elements according to the instructions that comprise the software module. In various embodiments, each or any combination of the engine computer system 100, user device(s) 120A and 120B, blockchain 116, digital wallet 104, order book 106, blockchain computer system 214, exchange 100, wallets 306 and 308, client computer systems 401 and 403, etc. . . . , each of which will be referred to individually for clarity as a "component" for the remainder of this paragraph, are implemented using an example of the computing system 500 of FIG. 5. In such embodiments, the following applies for each component: (a) the elements of the 500 computing system 500 shown in FIG. 5 (i.e., the one or more processors 502, one or more memory devices 506 or 508, one or more network interface devices 518, one or more display interfaces 514, and one or more user input adapters 510), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 506 and/or 508 (e.g., in various embodiments, in a volatile memory device such as a RAM, in an instruction register, and/or in a non-volatile memory device such as a flash memory or hard disk) and all actions described herein as performed by the software modules are performed by the processors 502 in conjunction with, as appropriate, the other elements in and/or connected to the computing system 500 (i.e., the network interface devices 518, display interfaces 514, user input adapters 510, and/or display device 516); (c) alternatively or additionally, to the extent it is described herein that the component processes and/or otherwise handles data, in some embodiments, such data is stored in the memory devices (e.g., in some embodiments, in a volatile memory device such as a RAM and/or in a non-volatile memory device such as a flash memory or hard disk) and/or is processed/handled by the processors 502 in conjunction, as appropriate, the other elements in and/or connected to the computing system 500 (e.g., the network interface devices 518, display interfaces 508, user input adapters 510, and/or display device 516); (d) alternatively or additionally, in some embodiments, memory devices store instructions that, when executed by the processors 502, cause the processors 502 to perform, in conjunction with, as appropriate, the other elements in and/or connected to the computing system 500, each or any combination of actions described herein as performed by the component and/or by any software modules described herein as included within the component.

Technical Advantages of Described Subject Matter

In certain example embodiments, the subject matter herein provides for improvements in verifying electronic transactions of a distributed database (e.g. a distributed ledger) in a distributed computer system environment (e.g., that includes multiple different computing nodes) or blockchain. The proof-of-work process performed by nodes of a blockchain computer system allow transactions to by cryptographically verified and become, essentially, immutable.

In certain example embodiments, a common computer system monitors how and when blockchain transactions are verified and/or incorporated in the blockchain. The monitoring process and how the transactions are generated allow the common computer system to determine when two separate transactions have been validated to thereby form a recorded exchange of transactions (e.g., one transaction from A to B and another from B to A). If one of the parties fails to submit a transaction or the submitted transaction fails, then common computer system may generate a new blockchain transaction that revokes the other one of the two transactions.

In certain example embodiments, a common computer system provides digital wallet information to the counter parties in an anonymous manner (e.g., the information regarding the respective parties is hashed).

The decentralized nature of the block chain can also be advantageous for certain applications, like a digital cryptocurrency, as no one system or entity is the effective holder of what is "correct." This eliminates or reduces reliance upon banks, governments, and other third parties and can result in lower transaction costs because these "middle-men" are cut out of the transaction process.

However, blockchain technology also poses problems for certain types of implementations. For example, the decentralized and anonymous nature of blockchain implementations may pose problems when used in an electronic exchange environment that trades public securities subject to regulatory requirements (such as, e.g., those imposed by the U.S. Securities and Exchange Commission (SEC) and/or analogous agencies in other jurisdictions). Such requirements relate to transparency and accountability on knowledge of who owns what with respect to traded securities or assets. Certain example embodiments described herein address such concerns while at the same time preserving the general anonymity and decentralized advantages of using blockchain technology. For example, embodiments described here monitor the blockchain to determine when the transactions of a trade have been properly submitted. Further, a centralized wallet information database is maintained that allows an exchange to determine what blockchain identifiers (e.g., addresses) are mapped to individual private keys of a digital wallet. In certain examples, a database of asset identifiers is also maintained so that an exchange computing system may determine which blockchain transactions are associated with which asset or security.

Another improvement that may be provided by certain example embodiments described herein relates to the speed at which transactions may be validated to settled. For example, an aspect of electronic exchange systems that may be hidden from ordinary users relates to the different entities and systems that interface with each other in order to facilitate electronic trading. A customer typically does not directly interact with the computerized exchange, but rather interacts with a broker who then interacts with the exchange on behalf of the customer. Once an order is matched and a trade occurs, other systems (perhaps controlled by entities that are separate from the exchange and/or the broker) may perform settlement and clearing or depository functions.

In such a traditional environment, an order submitting customer is required to "trust" that the various entities will perform their actions as required. For example, the customer would need to trust that an entity (depository and/or settlement functions) will properly record that the customer now "owns" 100 shares of "Company A" after completion of an electronic trade. Further, in such exchanges, while a trade match may be identified and processed relatively quickly (e.g., seconds or minutes), the settlement for that trade may take 2 to 3 days (or more).

Certain example embodiments described herein address the length of validation in an electronic exchange environment by integrating blockchain technology. The techniques described herein may be able to record and validate a trade within minutes or hours (e.g., depending on how the proof-of-work aspect is implemented for the blockchain). Furthermore, as shown herein, the blockchain and the exchange and continue to interface with existing recording system (e.g., depository systems). In certain instances, the process of verifying that both counter-party transactions have been recorded is improved and the speed at which a trade (e.g., client A→client B and client B→client A) is settled may also be increased.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although process steps, algorithms or the like, including without limitation with reference to FIGS. 2A-4, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described preferred embodiment that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, component, or step in this specification is intended to be dedicated to the public.

The invention claimed is:

1. A non-transitory computer readable storage medium having stored thereon computer readable instructions for use with a computer system that includes at least one processor, a memory, and a transceiver, the stored computer readable instructions comprising instructions that, when executed by the computer system, cause the computer system to: store a plurality of digital wallets that are respectively associated with different client entities, each of the plurality of digital wallets respectively linked to at least one corresponding private cryptographic key and at least one identifier that has been generated based on the at least one private cryptographic key; receive, via the transceiver and from different remote computing devices, electronic data messages that each include data transaction requests; add a received first data transaction request, which is associated with a first digital wallet, to a first list that is stored in the memory, the first list including a first plurality of data transaction requests, each of the first plurality of data transaction requests including size value and a type identifier; receive a second data transaction request, which is associated with a second digital wallet; identify a match between at least the stored first data transaction request and the received second data transaction request; in response to the identification of the match between at least the stored first data transaction request and the received second data transaction request: (1) generate a first hash identifier based on data included in the first digital wallet, (2) generate a second hash identifier based on data included in the second digital wallet, wherein the first and second hash identifiers are unique among other hash identifiers that are generated in response to each new match that is identified between data transaction requests, (3) generate (a) a first blockchain transaction and (b) a second blockchain transaction, where the first blockchain transaction is based on the first hash identifier and the second data transaction request and the second blockchain transaction is based on the second hash identifier and the first data transaction request; submit the generated first blockchain transaction and the generated second blockchain transaction to a distributed blockchain computing system for inclusion into a blockchain that is maintained on the distributed blockchain computing system; monitor the blockchain to verify that the first blockchain transaction and the second blockchain transaction have been included into the blockchain; and based on verification that the that the first blockchain transaction and the second blockchain transaction have been included into the blockchain, update at least one record of a database that is external to the distributed blockchain computing system.

2. The medium of claim 1, wherein the stored computer readable instructions comprise further instructions that, when executed by the computer system, cause the computer system to: as part of the monitoring, review blockchain transactions that are part of the blockchain to determine if the reviewed blockchain transactions include an identifier that corresponds to an identifier that is associated with one of the first and second data transaction requests.

3. A system comprising: at least one computer apparatus that includes electronic data storage, a transceiver, and a processing system, wherein the electronic data storage is configured to: store at least one ordered list of a plurality of data transaction requests that each include a type identifier and a quantity value; store a plurality of digital wallets that are respectively associated with different client entities, each of the plurality of digital wallets respectively linked to at least one corresponding private cryptographic key and at least one identifier that has been generated based on the at least one private cryptographic key; wherein the transceiver is configured to electronically communicate with a distributed blockchain computer system that includes multiple computing nodes, each computing node storing a copy, or a portion thereof, of a blockchain of the distributed blockchain computer system wherein the processing system includes at least one hardware processor coupled to the electronic data storage and the transceiver, and wherein the processing system is configured to: receive, via the transceiver and from different remote computing devices, electronic data messages that each include data transaction requests; add a received first data transaction request, which is associated with a first digital wallet, to the at least one ordered list; receive a second data transaction request, which is associated with a second digital wallet; determine a match between at least the stored first data transaction request and the received second data transaction request; as a result of the determining of the match between at least the stored first data transaction request and the received second data transaction request: (a) generate a first hash identifier based on data included in the first digital wallet, (b) generate a second hash identifier based on data included in the second digital wallet, c generate a first blockchain transaction that is based on the first hash identifier and the second data transaction request and submit, to at least one node of the distributed blockchain computing system, the generated first blockchain transaction for inclusion into the blockchain of the distributed blockchain computing system, and (d) generate a second blockchain transaction that is based on the second hash identifier and the first data transaction request and submit, to at least one node of the distributed blockchain computing system, the generated second blockchain transaction for inclusion into the blockchain of the distributed blockchain computing system, wherein new hash identifiers are generated each time a match is identified between data transaction requests and subsequently used in the generation of corresponding blockchain transactions; monitor the blockchain to verify that the first blockchain transaction and the second blockchain transaction have been included into the blockchain; and based on verification that the that the first blockchain transaction and the second blockchain transaction have been included into the blockchain, update at least one record of a database that is external to the distributed blockchain computing system.

4. The system of claim 3, wherein the first and second blockchain transactions are each generated to require at least two cryptographic keys to use outputs from the respective blockchain transactions.

5. The system of claim 4, where one of the at least two cryptographic keys is a key that represents an operator of the computer system.

6. The system of claim 3, wherein the processing system is further configured to: store a list of asset records that are each associated with a corresponding type identifier, wherein the monitoring of the blockchain includes determining if a data value that represents or is the type identifier is included in a validated blockchain transaction.

7. The system of claim 3, further comprising: the distributed blockchain computer system, wherein the blockchain is a closed blockchain.

8. The system of claim 3, wherein the generated first blockchain transaction or the generated second blockchain transaction includes the type identifier of the at least one ordered list and a quantity value for an amount of the type identifier.

9. The non-transitory computer readable storage medium of claim 1, wherein the first list is part of an order book data structure, the order book data structure including, a second list that includes a, second plurality of data transaction requests, wherein each of the first and second plurality of data transaction requests includes a side parameter that indicates which one of the first list and the second list the corresponding data transaction request is associated, wherein the side parameter of the first data transaction request is associated with the first list and the side parameter of the second data transaction request is associated with the second list.

10. The system of claim 3, wherein the electronic data storage is further configured to: store an order book data structure for at least a first type identifier, the order book data structure for the first type identifier including the at least one ordered list, and the at least one ordered list including a first ordered list and a second ordered list, wherein each of the plurality of data transaction requests also includes a side parameter that indicates which one of the first and second ordered list that the corresponding data transaction request is associated, wherein the side parameter of the first data transaction request is associated with the first list and the side parameter of the second data transaction request is associated with the second list.

* * * * *